US012574949B2

(12) United States Patent
Sahin et al.

(10) Patent No.: US 12,574,949 B2
(45) Date of Patent: Mar. 10, 2026

(54) SIDELINK SIGNAL POSITIONING COORDINATION BASED ON USER DEVICE CAPABILITY

(71) Applicant: NOKIA TECHNOLOGIES OY, Espoo (FI)

(72) Inventors: Taylan Sahin, Munich (DE); Mikko Säily, Espoo (FI); Rudraksh Shrivastava, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/959,525

(22) Filed: Nov. 25, 2024

(65) Prior Publication Data

US 2025/0089080 A1 Mar. 13, 2025

Related U.S. Application Data

(63) Continuation of application No. 18/703,910, filed as application No. PCT/EP2021/079509 on Oct. 25, 2021, now abandoned.

(51) Int. Cl.
*H04W 72/40* (2023.01)
*H04L 5/00* (2006.01)
(Continued)

(52) U.S. Cl.
CPC ........... *H04W 72/51* (2023.01); *H04L 5/0051* (2013.01); *H04W 64/006* (2013.01); *H04W 72/40* (2023.01); *H04W 88/04* (2013.01)

(58) Field of Classification Search
CPC .................................................. H04W 72/40
See application file for complete search history.

(56) References Cited

U.S. PATENT DOCUMENTS

2020/0170059 A1 5/2020 Belleschi et al.
2020/0344713 A1 10/2020 Gunnarsson et al.
(Continued)

FOREIGN PATENT DOCUMENTS

EP 4236154 A1 8/2023
EP 4295621 A1 12/2023
(Continued)

OTHER PUBLICATIONS

3GPP TR 37.985; V16.0.0; Release 16; LTE; 5G; Overall Description of Radio Access Network (RAN) Aspects for Vehicle-to-Everything (V2X) Based on LTE and NR; Jul. 2020; 37 pages.
(Continued)

*Primary Examiner* — Angel T Brockman

(74) *Attorney, Agent, or Firm* — Brake Hughes Bellermann LLP

(57) ABSTRACT

A method includes controlling transmitting by a target user node to be positioned to one or more other user nodes, a request; controlling receiving, by the target user node from one or more of the other user nodes, sidelink positioning capability information of the user node indicating one or more sidelink positioning capabilities of the other user node; determining, by the target user node based on the sidelink positioning capability information received from the one or more other user nodes, a sidelink positioning configuration for a sidelink positioning session to determine a position estimate of the target user node; controlling transmitting, via a sidelink channel, by the target user node to at least the one or more other user nodes that provided their sidelink positioning capability information, information indicating the sidelink positioning configuration for the sidelink positioning session; and controlling receiving a position estimate of the target user node.

34 Claims, 6 Drawing Sheets

(51) Int. Cl.
*H04W 64/00* (2009.01)
*H04W 72/51* (2023.01)
*H04W 88/04* (2009.01)

(56) References Cited

U.S. PATENT DOCUMENTS

| | | | |
|---|---|---|---|
| 2022/0236365 A1 | 7/2022 | Ko et al. | |
| 2022/0326335 A1 | 10/2022 | Ko et al. | |
| 2025/0008537 A1* | 1/2025 | Sahin ................... | H04W 76/14 |

FOREIGN PATENT DOCUMENTS

| | | | |
|---|---|---|---|
| EP | 4402918 A1 | 7/2024 | |
| WO | 2019145095 A1 | 8/2019 | |
| WO | 2020198616 A1 | 10/2020 | |
| WO | 2022010910 A1 | 1/2022 | |
| WO | 2022059876 A1 | 3/2022 | |

OTHER PUBLICATIONS

International Search Report and Written Opinion for International Application No. PCT/EP2021/079509, mailed on Jul. 20, 2022, 16 pages.
"Email Discussion Summary for [RAN-R18-WS-NON-EMBB-OPPO]", 3GPP TSG RAN Rel-18 workshop; RWS-210588; Agenda item: 4.2; Source: OPPO, May 28-Jul. 2, 2021, 20 pages.
"Email Discussion Summary for [RAN-R18-WS-NON-EMBB-OVERALL]", 3GPP TSG RAN Rel-18 workshop; RWS-210655; Agenda Item: 4.2; Source: RAN Vice-Chair (AT&T), Jun. 28-Jul. 2, 2021, 129 pages.
Communication pursuant to Article 94(3) EPC for European Patent Application No. 21799253.6, mailed on Apr. 28, 2025; 8 pages.
Communication pursuant to Article 94(3) EPC for European Application No. 21799253.6, mailed on Oct. 17, 2025, 8 pages.

* cited by examiner

Example Wireless Network 130

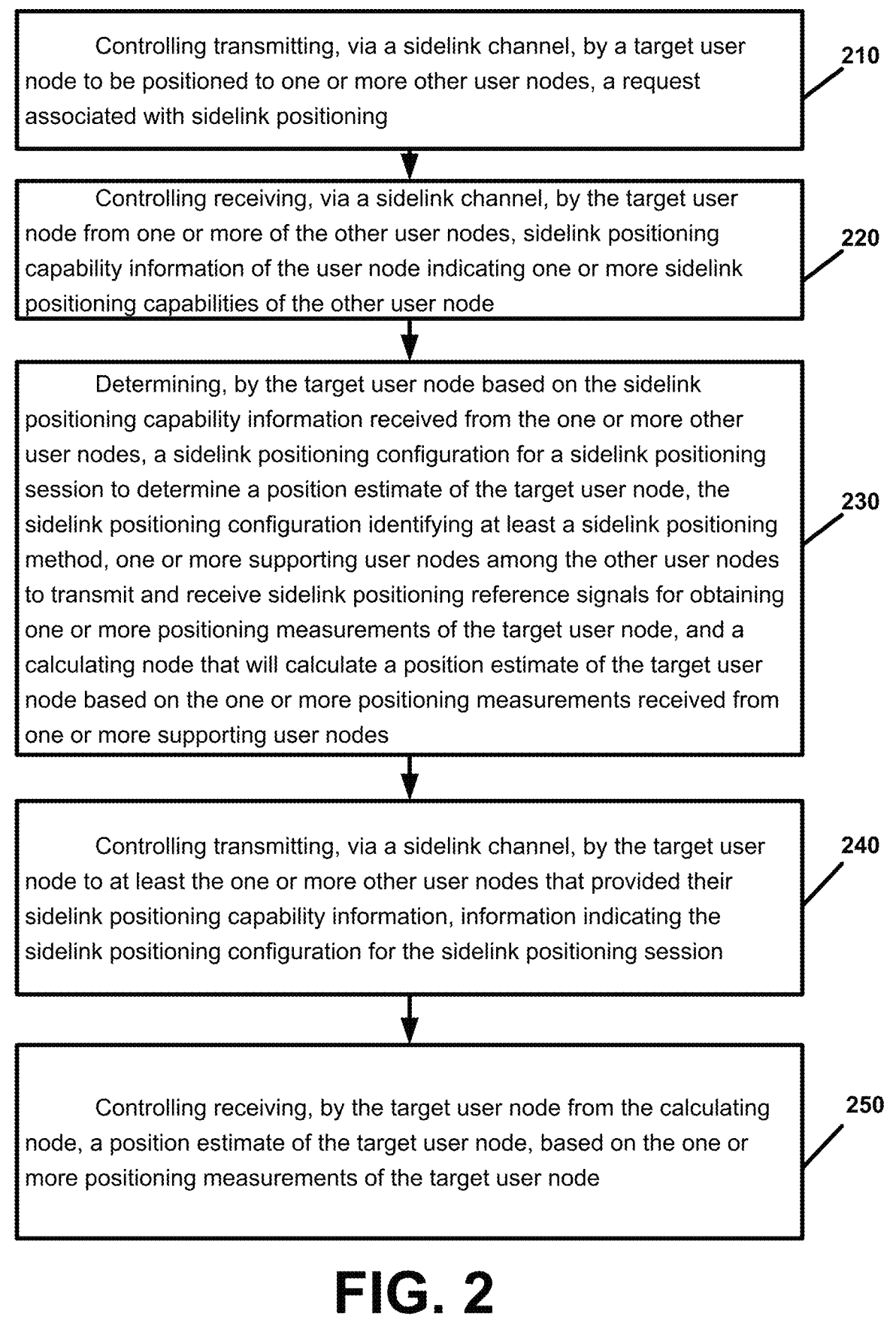

Controlling transmitting, via a sidelink channel, by a target user node to be positioned to one or more other user nodes, a request associated with sidelink positioning — 210

Controlling receiving, via a sidelink channel, by the target user node from one or more of the other user nodes, sidelink positioning capability information of the user node indicating one or more sidelink positioning capabilities of the other user node — 220

Determining, by the target user node based on the sidelink positioning capability information received from the one or more other user nodes, a sidelink positioning configuration for a sidelink positioning session to determine a position estimate of the target user node, the sidelink positioning configuration identifying at least a sidelink positioning method, one or more supporting user nodes among the other user nodes to transmit and receive sidelink positioning reference signals for obtaining one or more positioning measurements of the target user node, and a calculating node that will calculate a position estimate of the target user node based on the one or more positioning measurements received from one or more supporting user nodes — 230

Controlling transmitting, via a sidelink channel, by the target user node to at least the one or more other user nodes that provided their sidelink positioning capability information, information indicating the sidelink positioning configuration for the sidelink positioning session — 240

Controlling receiving, by the target user node from the calculating node, a position estimate of the target user node, based on the one or more positioning measurements of the target user node — 250

FIG. 2

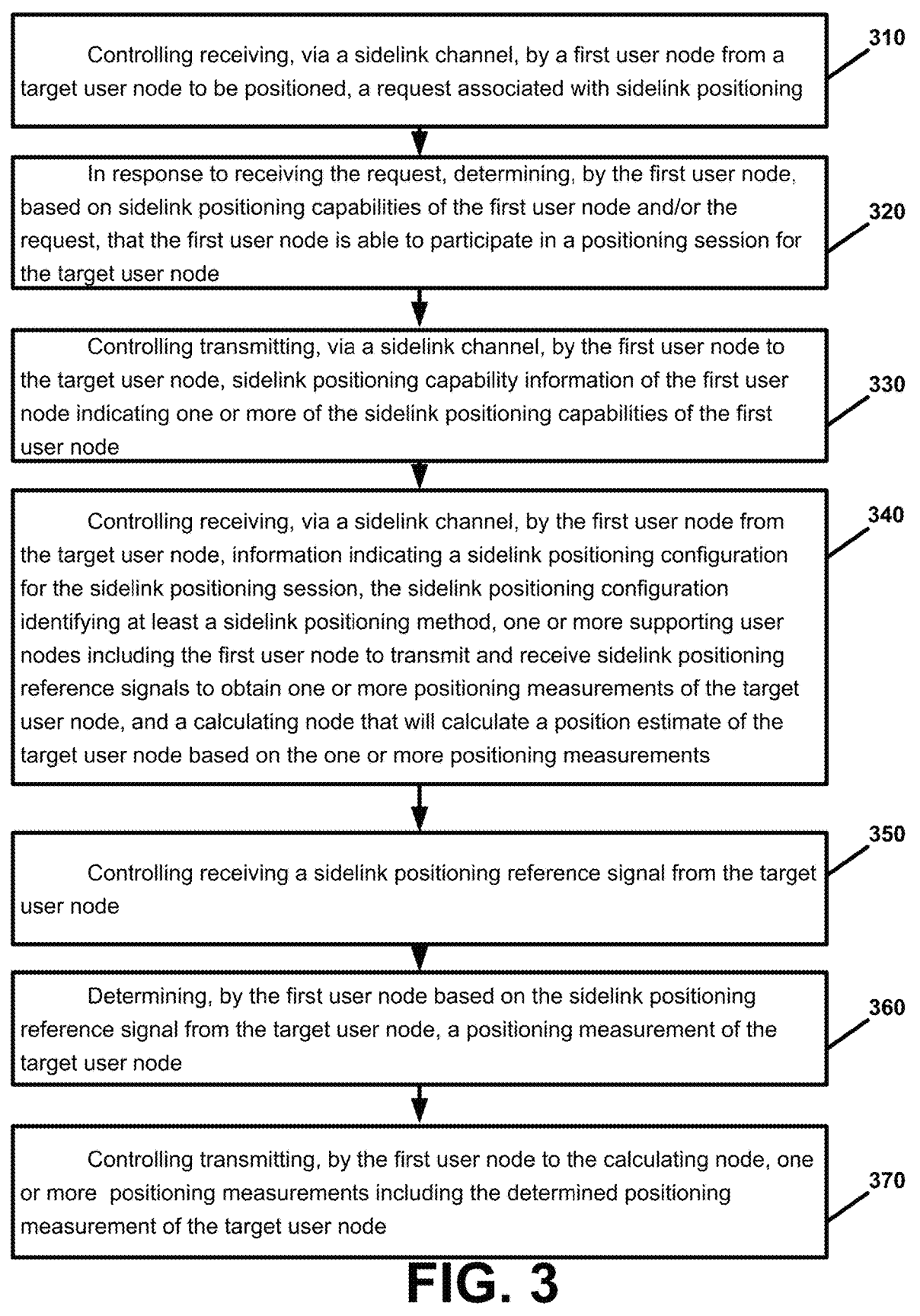

Controlling receiving, via a sidelink channel, by a first user node from a target user node to be positioned, a request associated with sidelink positioning — 310

In response to receiving the request, determining, by the first user node, based on sidelink positioning capabilities of the first user node and/or the request, that the first user node is able to participate in a positioning session for the target user node — 320

Controlling transmitting, via a sidelink channel, by the first user node to the target user node, sidelink positioning capability information of the first user node indicating one or more of the sidelink positioning capabilities of the first user node — 330

Controlling receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and a calculating node that will calculate a position estimate of the target user node based on the one or more positioning measurements — 340

Controlling receiving a sidelink positioning reference signal from the target user node — 350

Determining, by the first user node based on the sidelink positioning reference signal from the target user node, a positioning measurement of the target user node — 360

Controlling transmitting, by the first user node to the calculating node, one or more  positioning measurements including the determined positioning measurement of the target user node — 370

FIG. 3

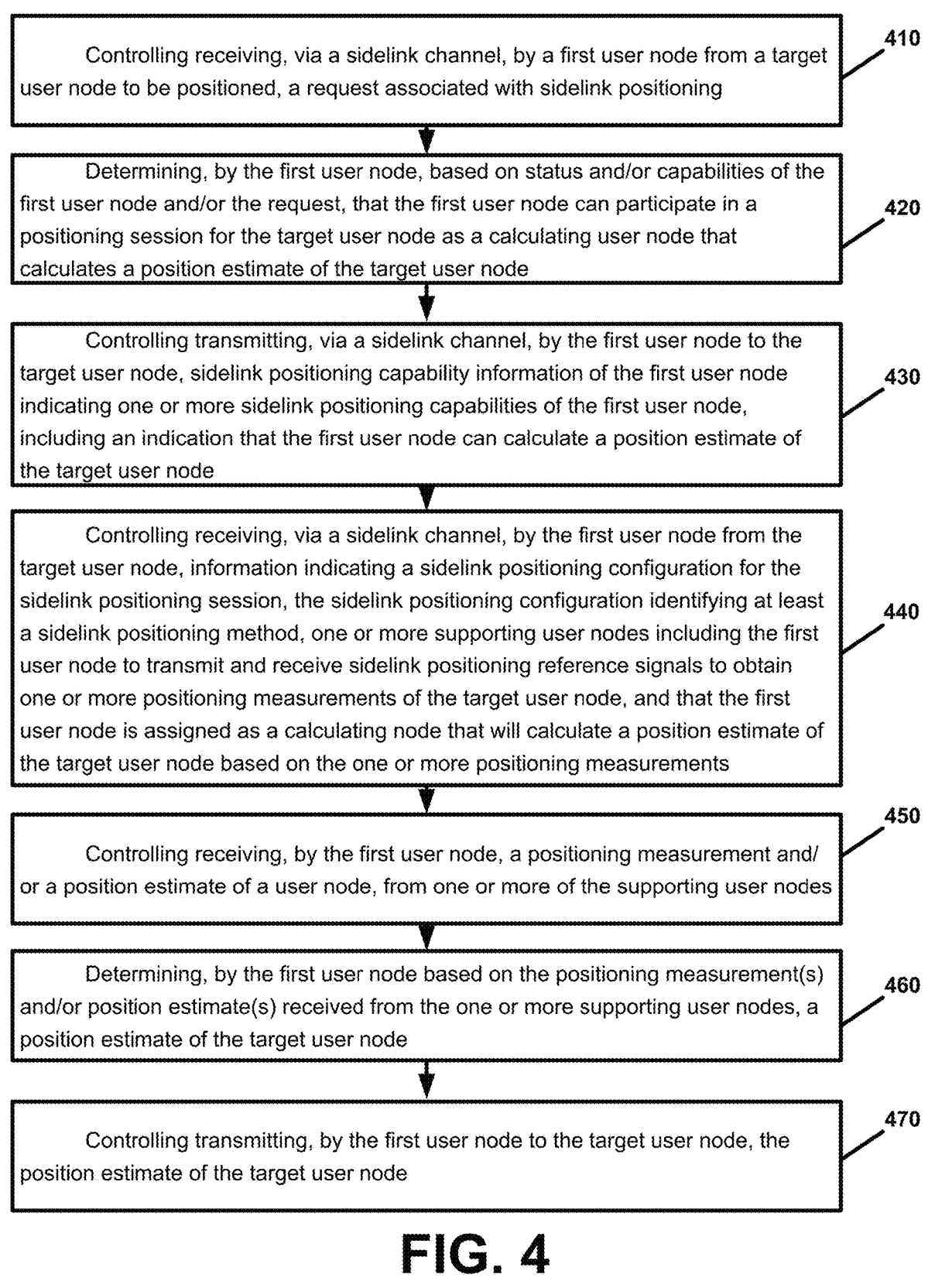

Controlling receiving, via a sidelink channel, by a first user node from a target user node to be positioned, a request associated with sidelink positioning    410

Determining, by the first user node, based on status and/or capabilities of the first user node and/or the request, that the first user node can participate in a positioning session for the target user node as a calculating user node that calculates a position estimate of the target user node    420

Controlling transmitting, via a sidelink channel, by the first user node to the target user node, sidelink positioning capability information of the first user node indicating one or more sidelink positioning capabilities of the first user node, including an indication that the first user node can calculate a position estimate of the target user node    430

Controlling receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and that the first user node is assigned as a calculating node that will calculate a position estimate of the target user node based on the one or more positioning measurements    440

Controlling receiving, by the first user node, a positioning measurement and/or a position estimate of a user node, from one or more of the supporting user nodes    450

Determining, by the first user node based on the positioning measurement(s) and/or position estimate(s) received from the one or more supporting user nodes, a position estimate of the target user node    460

Controlling transmitting, by the first user node to the target user node, the position estimate of the target user node    470

FIG. 4

SIDELINK SIGNAL POSITIONING COORDINATION BASED ON USER DEVICE CAPABILITY

CROSS-REFERENCE TO RELATED APPLICATIONS

This is a continuation patent application of U.S. application Ser. No. 18/703,910, filed Apr. 23, 2024, entitled "SIDELINK SIGNAL POSITIONING COORDINATION BASED ON USER DEVICE CAPABILITY" which is a national stage entry of International Application No. PCT/EP2021/079509, filed Oct. 25, 2021, entitled "SIDELINK SIGNAL POSITIONING COORDINATION BASED ON USER DEVICE CAPABILITY" both of which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3<sup>rd</sup> Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: controlling transmitting, via a sidelink channel, by a target user node to be positioned to one or more other user nodes, a request associated with sidelink positioning; controlling receiving, via a sidelink channel, by the target user node from one or more of the other user nodes, sidelink positioning capability information of the user node indicating one or more sidelink positioning capabilities of the other user node; determining, by the target user node based on the sidelink positioning capability information received from the one or more other user nodes, a sidelink positioning configuration for a sidelink positioning session to determine a position estimate of the target user node, the sidelink positioning configuration identifying at least a sidelink positioning method, one or more supporting user nodes among the other user nodes to transmit and receive sidelink positioning reference signals for obtaining one or more positioning measurements of the target user node, and a calculating node that will calculate a position estimate of the target user node based on the one or more positioning measurements received from one or more supporting user nodes; controlling transmitting, via a sidelink channel, by the target user node to at least the one or more other user nodes that provided their sidelink positioning capability information, information indicating the sidelink positioning configuration for the sidelink positioning session; and controlling receiving, by the target user node from the calculating node, a position estimate of the target user node, based on the one or more positioning measurements of the target user node.

According to an example embodiment, a method may include controlling receiving, via a sidelink channel, by a first user node from a target user node to be positioned, a request associated with sidelink positioning; in response to receiving the request, determining, by the first user node, based on sidelink positioning capabilities of the first user node and/or the request, that the first user node is able to participate in a positioning session for the target user node; controlling transmitting, via a sidelink channel, by the first user node to the target user node, sidelink positioning capability information of the first user node indicating one or more of the sidelink positioning capabilities of the first user node; controlling receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and a calculating node that will calculate a position estimate of the target user node based on the one or more positioning measurements; controlling receiving a sidelink positioning reference signal from the target user node; determining, by the first user node based on the sidelink positioning reference signal from the target user node, a positioning measurement of the target user node; and controlling transmitting, by the first user node to the calculating node, one or more positioning measurements including the determined positioning measurement of the target user node.

According to another example embodiment, a method may include controlling receiving, via a sidelink channel, by a first user node from a target user node to be positioned, a request associated with sidelink positioning; determining, by the first user node, based on status and/or capabilities of the first user node and/or the request, that the first user node can participate in a positioning session for the target user node as a calculating user node that calculates a position estimate of the target user node; controlling transmitting, via a sidelink channel, by the first user node to the target user node, sidelink positioning capability information of the first user node indicating one or more sidelink positioning capabilities of the first user node, including an indication that the first user node can calculate a position estimate of the target user node; controlling receiving, via a sidelink channel, by the first user node from the target user node, information indicating a sidelink positioning configuration for the side-link positioning session, the sidelink positioning configuration identifying at least a sidelink positioning method, one or more supporting user nodes including the first user node to transmit and receive sidelink positioning reference signals to obtain one or more positioning measurements of the target user node, and that the first user node is assigned as a calculating node that will calculate a position estimate of the target user node based on the one or more positioning measurements; controlling receiving, by the first user node, a positioning measurement and/or a position estimate of a user node, from one or more of the supporting user nodes; determining, by the first user node based on the positioning measurement(s) and/or position estimate(s) received from the one or more supporting user nodes, a position estimate of the target user node; and controlling transmitting, by the first user node to the target user node, the position estimate of the target user node.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 2 is a flow chart illustrating operation of a user node (or UE).

FIG. 3 is a flow chart illustrating operation of a user node (or UE).

FIG. 4 is a flow chart illustrating operation of a user node (or UE).

DETAILED DESCRIPTION

Figure 1:
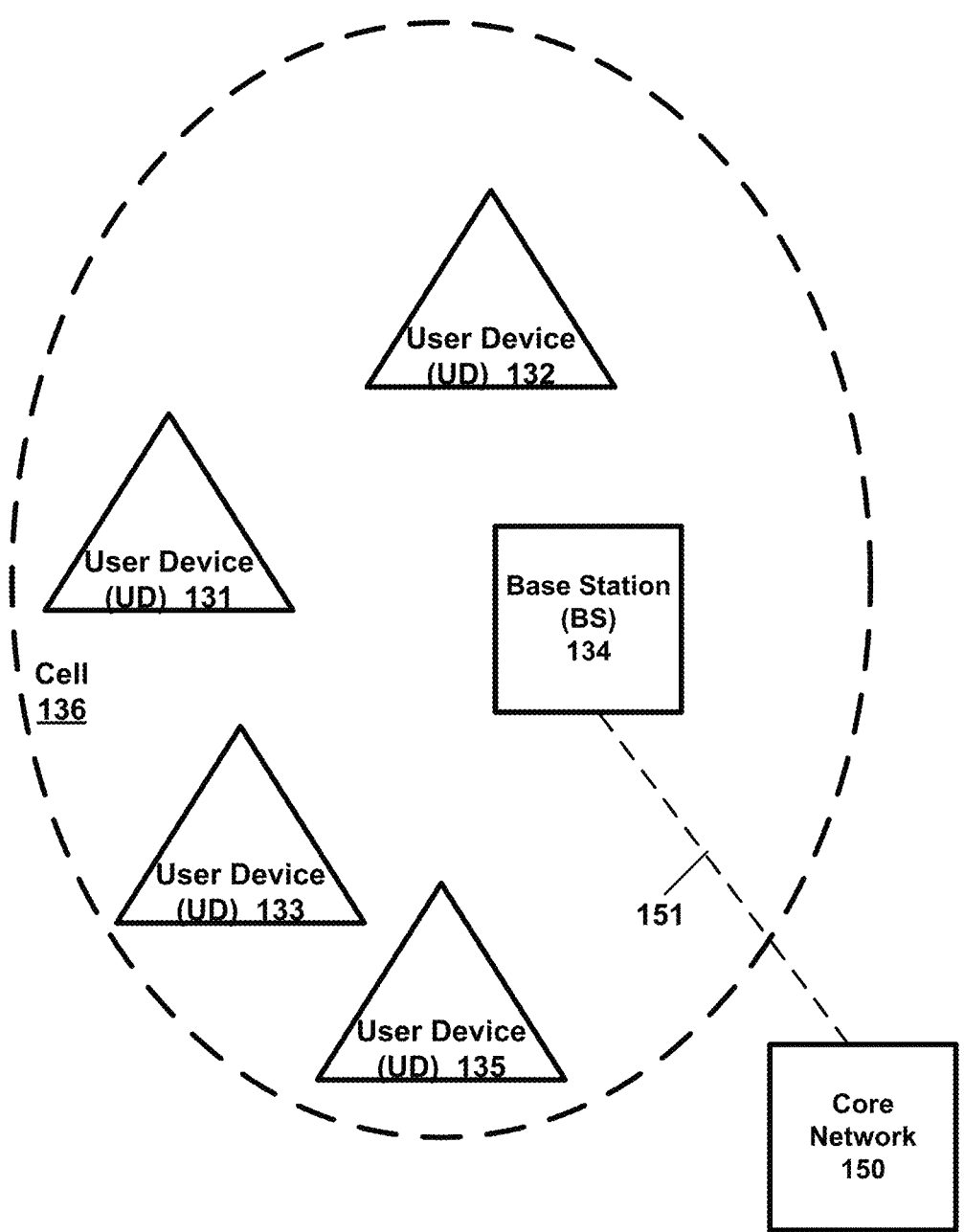
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e) Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

In some cases, a UE positioning function may be used to determine a geographic position (or location) of a UE. In some cases, UE positioning may be performed or determined based on positioning reference signals (PRSs). For example, a positioning reference signal (PRS) may be a reference signal that may be transmitted and/or received that may be used to obtain positioning measurements and/or to allow a UE position to be determined or estimated. In some cases, a UE position (or UE position estimate) may be determined, for example, based on positioning measurements, such as a measured timing and/or measured received power (or other signal measurement) of one or more PRSs, for example. For example, PRSs may be or may include PRS sequences that may be pseudo-random sequences that have good (or relatively high) auto-correlation properties and small (or relatively low) cross-correlation properties, e.g., to allow timing or time differences of two signals to be determined.

In the case of uplink/downlink (UL/DL) positioning (where PRS signals are communicated between a UE and a network node or gNB), PRS signals may include downlink (DL) PRS signals (transmitted by a gNB or other network node to a UE), or uplink (UL) PRS signals (transmitted by a UE to a gNB or network node).

Sidelink (SL) communications (which may also be referred to as device-to-device communications, or UE-to-UE communications) are communications directly between UEs (or directly between user devices or user nodes), e.g., without necessarily using or going through a network node (gNB or BS). A UE may obtain SL resources for a SL channel, to perform SL communications with one or more other nearby UEs. A UE may be involved in both traditional UE-gNB communications, and SL communications. Thus, a UE may have, for example, a UE-gNB radio link established for communication with a gNB or network node, and the UE may be part of SL group in which the UE may transmit and/or receive signals or information via SL resources of a SL channel with other member UEs of the SL group, for example.

In a case of sidelink (SL) positioning, PRS signals may include sidelink positioning reference signals (SL PRSs), which may include reference signals transmitted by a UE and/or received by a UE via a sidelink channel (e.g., sidelink resources that may be used for direct UE-to-UE communication) that may be used to obtain positioning measurements and/or position a UE or other object. In SL positioning, one or more UEs transmit SL PRSs to one or more other UEs, to allow a positioning measurement(s) to be determined by the receiving UEs and/or to allow a position estimate of a UE to be calculated (based on one or more positioning measurements). In SL positioning, one or more UEs (that are participating in the positioning session) may determine a positioning measurement(s) (based on received SL PRSs), such as amplitude or reference signal received power (RSRP), angle of arrival, time of arrival, phase, or other positioning measurement. Depending on the technique used for SL positioning, one or more of these positioning measurements are required to calculate a position estimate of a target UE (the UE to be positioned). Sidelink (SL) positioning may be performed using different or various positioning methods, such as, e.g., Time Difference of Arrival (TDOA), Angle of Departure (AoD), multi-round trip time (multi-RTT) positioning, Angle of Arrival (AOA), or other positioning techniques.

Presently, there are no techniques or systems available that allow coordination among UEs for SL positioning. A variety of issues or complications may arise when UEs may attempt to perform (or coordinate) a SL positioning session (in which SL PRSs will be transmitted between UEs to position a target UE). UEs may support different or reduced capabilities for positioning. First, UEs may or may not support transmitting or receiving certain reference signals over SL that are used for positioning (SL PRS). Second, UEs may have differing capabilities to support certain positioning measurements based on the received reference signals, such as time-based or angle-based positioning measurements. Next, UEs might have different capabilities in terms of calculating the position (or location) estimates based on these positioning measurements. Moreover, UEs may or may not be synchronized, which may be required for some positioning techniques (e.g., for observing time difference of arrival of reference signals received from multiple UEs). In addition, some UEs may have relaxed processing time or power, and/or may not support calculating an absolute position, but only relative position. Also, UEs may be in different energy states or levels, that might prevent such UEs from participating in a SL positioning session, e.g., where the UE may be prevented from transmitting/receiving SL PRSs, performing positioning measurements, and/or calculating the UE position estimate (based on the positioning measurement(s)), even if the UE has the required capabilities. Capabilities of UEs may differ significantly, such as, for example, in vehicular use cases that involve different types of UEs. These may include, for example, vehicular UEs that belong to different manufacturers, having different capabilities, pedestrian UEs with very limited capabilities, and UE-type Road Side Units (RSU) that might have much higher capabilities.

In UL/DL-based positioning, the centralized positioning function/entity, referred to as a Location Management Function (LMF) in 5G NR, is the entity that coordinates the positioning services (positioning session) among UE(s) and gNB(s). By taking into account the capability of UEs, the LMF determines a positioning configuration, e.g., such as which positioning method to be used, a configuration of gNBs and UEs for transmitting/receiving reference signals in UL/DL for positioning, and performing positioning measurements and calculating a position estimate of a UE based on the positioning measurements. Further, again based on UE capabilities, the LMF can determine whether the position estimates should be calculated by the UE or the LMF itself, based on the performed positioning measurements. Thus, for UL/DL positioning, the UE positioning process is controlled or coordinated by the network entity (e.g., LMF or other network entity or network node).

However, in case of SL positioning (e.g., where UEs transmit and/or receive SL PRSs, and then may determine positioning measurement(s) based on received SL PRSs, and possibly calculate a position estimate of the target UE), there is no coordination mechanism for SL positioning available, especially outside the network coverage, where network control is not possible (or even in partial network coverage where only some UEs may have a network connection, but other UEs may not have a network connection). SL positioning presents challenges since it has a distributed and highly dynamic setting as compared to UL/DL positioning (which is controlled by the LMF entity, based on the network connections to UEs), for which the positioning needs to be coordinated by taking UE capabilities into account.

FIG. 2 is a flow chart illustrating operation of a user node (e.g., UE). The method of FIG. 2 is written from the perspective of a target UE/user node to be positioned. Operation 210 includes controlling transmitting, via a sidelink channel, by a target user node to be positioned to one or more other user nodes (other UEs), a request associated with sidelink positioning. For example, the target user node (e.g., target UE) may be a UE to be positioned and/or a UE that may request other UEs to participate in a SL positioning session to obtain a position estimate of the target UE.

Operation 220 of FIG. 2 includes controlling receiving, via a sidelink channel, by the target user node from one or more of the other user nodes, sidelink positioning capability information of the user node indicating one or more sidelink positioning capabilities of the other user node.

Operation 230 of FIG. 2 includes determining, by the target user node based on the sidelink positioning capability information received from the one or more other user nodes, a sidelink positioning configuration for a sidelink positioning session to determine a position estimate of the target user node, the sidelink positioning configuration identifying at least a sidelink positioning method, one or more supporting user nodes among the other user nodes to transmit and receive sidelink positioning reference signals for obtaining one or more positioning measurements of the target user node, and a calculating node that will calculate a position estimate of the target user node based on the one or more positioning measurements received from one or more supporting user nodes. For example, the SL positioning configuration may indicate one or more configuration parameters for the positioning session, e.g., such as a positioning method to be used to position the target UE, an identification of UEs that will be involved in the positioning session as supporting UE (e.g., those UEs that will transmit SL PRSs, receive SL PRSs from other supporting UEs, and/or perform positioning measurements based on received SL PRSs), and an identification of a calculating node (e.g., either a calculating UE, or a calculating network entity such as a LMF, gNB or other network entity) to calculate the position estimate of the target UE based on one or more positioning measurements (e.g., received from supporting UEs). The SL positioning configuration may include other configuration parameters.

Operation 240 of FIG. 2 includes controlling transmitting, via a sidelink channel, by the target user node to at least the one or more other user nodes that provided their sidelink positioning capability information, information indicating the sidelink positioning configuration for the sidelink positioning session. For example, by communicating the SL positioning configuration to the other UEs that provided their SL positioning capability information, the target UE may inform these other UEs of the various configuration parameters of the SL positioning session, e.g., such as the positioning method to be used, an identification of supporting UEs that will transmit and receive SL PRSs and/or determine a positioning measurement, and an identification of a calculating node, so that the supporting UEs may participate in the SL positioning session as requested by the target UE (according to the indicated SL positioning configuration).

And, operation 250 includes controlling receiving, by the target user node from the calculating node, a position estimate of the target user node, based on the one or more positioning measurements of the target user node. For example, the calculating node (e.g., either a UE, or a LMF or other network node or network entity, may calculate the position (or location) estimate of the target UE based on one or more received positioning measurements (received by calculating node from supporting UE(s)). The calculating node may then forward the position estimate of the target UE to the target UE.

For the method of FIG. 2, the request may include at least one of: a positioning request, which requests participation in a sidelink positioning session, by the other user nodes, to obtain a position estimate of the target user node; and/or a request for sidelink positioning capability information of the one or more other user nodes (e.g., to allow the target UE to determine the SL positioning configuration for the SL positioning session).

The method of FIG. 2 may further include controlling receiving, by the target user node (e.g., target UE) from one or more of the other user nodes via sidelink channel, a sidelink positioning reference signal; determining, by the target user node based on the sidelink positioning reference signal received from one or more of the other user nodes, a positioning measurement for the target user node; and controlling transmitting, by the target user node to the calculating node, the positioning measurement of the target user node determined by the target user node. The method of FIG. 2 may also include controlling transmitting, by the target user node to at least one or more of the other user nodes via a sidelink channel, a sidelink positioning reference signal, to enable one or more of the other user nodes to determine a positioning measurement of the target user node. Thus, for example, the target UE may also operate as a supporting UE, where the target UE may receive SL PRSs from other supporting UE(s), determine a positioning measurement for the target UE based on the received SL PRS(s), and forward or send its determined positioning measurement to the calculating node. The target UE may also transmit SL PRSs to at least the other supporting UEs, to allow them to determine a positioning measurement for the target UE. In some cases, the target UE may also be the calculating node, and in such case, the target UE need not forward its determined positioning measurement to the calculating UE.

For the method of FIG. 2, the request transmitted by the target user node may include at least one of: a required or preferred Quality of Service (QoS) or accuracy of the position estimate of the target user node; and/or one or more sidelink positioning methods that may be used to position the target user node. For example, the request transmitted by the target UE may indicate one or more requirements of the positioning session for the target UE, such as, for example, a required QoS or accuracy of the position estimate, and/or one or more positioning method(s) that may be used. For example, this may allow one or more of the other UEs to compare these positioning session requirements and/or preferences to its SL positioning capabilities, so the other UE may determine if it is able to (or should) participate in the positioning session. For example, if a request indicates that a high accuracy positioning estimate will be required, and an AOA positioning method will be used, the other UE (receiving the request) may then compare these positioning session requirements to its capabilities. If the other UE can perform AOA positioning measurements at the indicated accuracy or QoS, then the other UE may then respond to the request (at operation 220) with its SL positioning capability information. Otherwise, for example, if the other UE (that received the request) is unable to comply or participate in the positioning session based on the indicated requirements (e.g., the other UE is unable to perform positioning measurements for AOA, or is unable to perform positioning measurements for the indicated high accuracy), then the other UE may simply not respond to the request with its SL positioning capability information, or alternatively, may reply with its SL positioning capability information, e.g., to allow the target UE to adjust or change the required parameters (e.g., change the positioning method and/or accuracy in this example), if there are not enough other UEs that have indicated they can participate based on the indicated or preferred requirements or criteria, for example.

Also, for example, the request transmitted by the target user node may include a requirement or preference to include or use a relay user node for the sidelink positioning session, where the relay user node is at least one of: 1) a user node that has a connection to the network and is able to operate as a user node-to-network relay to communicate or forward information received from a user node to the network and/or is able communicate with both user nodes and the network, and/or 2) a user node that is able to operate as a user node-to-user node relay that is able to communicate with and/or forward information to a user node that can operate as a user node-to-network relay. For example, the target UE may prefer to have the network (e.g., LMF or gNB) perform the position estimate (as the calculating node). However, the target UE and/or one or more other UEs may not have a connection to the network. Thus, in in such case (as an example), using the LMF as a calculating node may require at least one of the supporting UEs to be a relay UE, e.g., either 1) a UE that has a connection to the network or be able to forward information to a UE that has a connection to the network (e.g., so that positioning measurements may be forwarded to the calculating LMF via such relay UE, and/or a position estimate be returned back to the target UE via such relay UE); or 2) a UE that is able to communicate with other UE(s) that have a network connection. There may be other scenarios where it may be useful to have a relay UE participate in the positioning session.

For the method of FIG. 2, the sidelink positioning capability information received by the target user node from the one or more other user nodes may include, for example, information indicating at least one of the following for the other user node: whether the other user node can transmit and/or receive a sidelink positioning reference signal or other reference signal used for positioning; one or more supported configurations or transmitting and/or receiving sidelink positioning reference signals; one or more supported sidelink positioning methods that are supported by the other user node; whether the other user node is synchronized and an indication of its synchronization source; whether the other user node can calculate a position estimate of the target user node, and/or whether the other user node can calculate an absolute or relative position of the target user node; the other user node's knowledge of its own position; an energy status or level that is required for the other user node for positioning; whether the other user node supports sidelink relaying of information between a user node and the network; whether the other user node is connected to the network; whether the other user node would also like to obtain a position of itself; whether the other user node would like to obtain or receive a position estimate of one or more user nodes; whether the other user node is participating in another positioning session, and/or identifying a target user node for another positioning session for which the other user node is participating.

For the method of FIG. 2, the request may include information indicating whether a user node may forward the request to another user node. For example, this may allow other UEs/user nodes, which may be beyond the initial range of the target UE (or may not have received the original request from the target UE), to respond to the request by sending their SL positioning capability information to the target UE (either directly or via a relay UE).

FIG. 3 is a flow chart illustrating operation of a UE. For example, the method of FIG. 3 is written from the perspective of a supporting UE/user node, that may participate in the SL positioning session by transmitting and/or receiving SL PRSs, and determining a positioning measurement based on received SL PRSs. Operation 310 includes controlling receiving, via a sidelink channel, by a first user node (first UE, which may be another UE or a supporting UE) from a target user node (e.g., target UE) to be positioned, a request associated with sidelink positioning. For example, the request may include at least one of: a positioning request, which requests participation in a sidelink positioning session, by the other user nodes, to obtain a position estimate of the target user node; and/or a request for sidelink positioning capability information of the one or more other user nodes.

Operation 320 of FIG. 3 includes in response to receiving the request, determining, by the first user node, based on sidelink positioning capabilities of the first user node and/or the request, that the first user node is able to participate in a positioning session for the target user node. For example, the first UE may compare one or more requirements or preferences for the SL positioning session to one or more SL positioning capabilities of the first UE, to determine whether the first user node/first UE is able to participate in the positioning session, as required and/or preferred by the target user node/target UE.

Operation 330 of FIG. 3 includes controlling transmitting, via a sidelink channel, by the first user node to the target user node, sidelink positioning capability information of the first user node indicating one or more of the sidelink positioning capabilities of the first user node. For example, the first UE may determine that the first UE is able to participate in the SL positioning session, and then at operation 330, the first UE sends it SL positioning capability information indicating one or more of its SL positioning capabilities to the target UE.

Operation 340 of FIG. 3 includes controlling receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and a calculating node that will calculate a position estimate of the target user node based on the one or more positioning measurements. Operation 350 includes controlling receiving a sidelink positioning reference signal from the target user node. Operation 360 includes determining, by the first user node based on the sidelink positioning reference signal from the target user node, a positioning measurement of the target user node. Operation 370 includes controlling transmitting, by the first user node to the calculating node, one or more positioning measurements including the determined positioning measurement of the target user node.

The method of FIG. 3 may further include controlling transmitting, by the first user node (first UE) to at least the target user node (target UE) via a sidelink channel, a sidelink positioning reference signal, to enable the target user node to determine a positioning measurement of the target user node.

For the method of FIG. 3, the controlling transmitting, by the first user node to the calculating node, the positioning measurement may include: controlling transmitting, by the first user node to the calculating node, the positioning measurement of the target user node and a position estimate of the first user node. Thus, the first UE may obtain or determine its own estimated position, and may also determine a positioning measurement of the target UE. The first UE may, for example, then send to the calculating node both its own position estimate and the positioning measurement it has determined for the target UE to the calculating node.

For the method of FIG. 3, the request may include at least one of: a positioning request, which requests participation in a sidelink positioning session, by the other user nodes, to obtain a position estimate of the target user node; and/or a request for sidelink positioning capability information of the one or more other user nodes. Also, as noted, the calculating node may include (or may be), for example, either a calculating user node (calculating UE), or a calculating network node, location management function (LMF) or other network entity, that calculates the position estimate for the target UE (and possibly of one or more other UEs that may have requested positioning).

Also, for the method of FIG. 3, the request may include at least one of: a required or preferred Quality of Service or accuracy of the position estimate of the target user node; and/or one or more sidelink positioning methods that may be used to position the target user node.

For the method of FIG. 3, the determining that the first user node (first UE) is able to (or can) participate in a positioning session for the target user node (target UE) may include one or more of the following, for example: determining, by the first user node (first UE), that the first user node can meet or satisfy, or assist in meeting, the required or preferred Quality of Service or accuracy of the position estimate, indicated by the request; and/or determining, by the first user node, that the first user node can perform, or can provide a positioning measurement that will assist in performing, at least one of the one or more indicated sidelink positioning methods that may be used to position the target user node.

For the method of FIG. 3, the determining, by the first user node (first UE), based on sidelink positioning capabilities of the first user node and/or the request, that the user node is able to participate in a positioning session for the target user node may include: determining, by the first user node (first UE), that the user node is able to participate in a positioning session for the target user node, based on a comparison, by the first user node, of one or more sidelink positioning capabilities of the first user node to one or more requirements or preferences of the positioning session indicated by the request, wherein the sidelink positioning capabilities of the first user node may include one or more of the following: whether the first user node can transmit and/or receive a sidelink positioning reference signal or other reference signal used for positioning; one or more supported configurations or transmitting and/or receiving sidelink positioning reference signals; one or more supported sidelink positioning methods that are supported by the first user node; whether the first user node is synchronized and an indication of its synchronization source; whether the first user node can calculate a position estimate of the target user node, and/or whether the first user node can calculate an absolute or relative position of the target user node; the first user node's knowledge of its own position; an energy status or level of the first user node and/or an energy status or level that is required for the first user node for positioning; whether the first user node supports sidelink relaying of information between a user node and the network; whether the first user node is connected to the network; whether the first user node would also like to obtain a position of itself; whether the first user node would like to obtain or receive a position estimate of one or more user nodes; whether the first user node is participating in another positioning session, and/or identifying a target user node for another positioning session for which the first user node is participating.

The method of FIG. 3 may further include controlling transmitting, via a sidelink channel, by the first user node (first UE) to at least the target user node, sidelink positioning capability information of the first user node indicating one or more of the sidelink positioning capabilities of the first user node.

FIG. 4 is a flow chart illustrating operation of a user node (or UE). The method of FIG. 4 is written from the perspective of a calculating node (e.g., either a calculating UE or a calculating network node, such as a LMF, or gNB) that may determine or calculate a position estimate of a target UE(s) based on one or more positioning measurements. Operation 410 of FIG. 4 includes controlling receiving, via a sidelink channel, by a first user node (e.g., first UE) from a target user node (e.g., target UE) to be positioned, a request associated with sidelink positioning. Operation 420 includes determining, by the first user node, based on status and/or capabilities of the first user node and/or the request, that the first user node can participate in a positioning session for the target user node as a calculating user node that calculates a position estimate of the target user node. Operation 430 includes controlling transmitting, via a sidelink channel, by the first user node to the target user node, sidelink positioning capability information of the first user node indicating one or more sidelink positioning capabilities of the first user node, including an indication that the first user node can calculate a position estimate of the target user node. Operation 440 includes controlling receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and that the first user node is assigned as a calculating node that will calculate a position estimate of the target user node based on the one or more positioning measurements. Operation 450 includes controlling receiving, by the first user node, a positioning measurement and/or a position estimate of a user node, from one or more of the supporting user nodes. Operation 460 includes determining, by the first user node based on the positioning measurement(s) and/or position estimate(s) received from the one or more supporting user nodes, a position estimate of the target user node. Operation 470 includes controlling transmitting, by the first user node to the target user node, the position estimate of the target user node. For example, the first user node may be a calculating user node (calculating UE) that determines a position estimate of at least the target user node.

For the method of FIG. 4, the method may further include: controlling transmitting, by the first user node to at least the target user node via a sidelink channel, a sidelink positioning reference signal, to enable the target user node to determine a positioning measurement of the target user node; and/or controlling receiving, by the first user node from the target user node via a sidelink channel, a sidelink positioning reference signal, to enable the first user node to determine a positioning measurement of the target user node. Also, for example, wherein the position estimate received for one or more of the supporting user nodes may include an accuracy indication for the position estimate.

Also, with respect to the methods of FIGS. 2-4, for example, in addition to providing their SL capability information to the target UE, (candidate) supporting UEs may indicate (e.g., possibly within their SL capability information sent to target UE or other message) to the target UE: 1) whether they want to join (participate) in the SL positioning session or not, e.g., as either a supporting UE (that sends and/or receives SL PRSs, and/performs positioning measurements) and/or a calculating UE (that calculates UE position estimate(s)), and/or 2) whether they (the candidate supporting UE) would like to be positioned or not within (or as part of) this SL positioning session. For example, candidate supporting UEs may indicate to the target UE whether they would like to (or are able to) be a supporting UE and/or a calculating UE for the SL positioning session. The target UE may then determine the SL positioning configuration for the SL positioning session based on all of this received information received from the candidate supporting UEs that respond (e.g., including SL capability information, whether they want to join the SL positioning session and in what capacity or role, and whether they want to be positioned or not). The target UE may then broadcast the SL positioning configuration to at least all supporting UEs and calculating node (or calculating UE), wherein the SL positioning configuration may indicate the positioning method, an identification of supporting UE(s) and a calculating node or calculating UE, and an indication of the UEs that are to be positioned. The supporting UEs may then transmit and/or receive SL PRSs and may determine a positioning measurement for each UE to be positioned, and may send/transmit the positioning measurements to the calculating node or calculating UE. A candidate supporting UE may also obtain (or have already obtained) its position estimate. Thus, for example, supporting UEs may send to the calculating node (or calculating UE) the positioning measurement(s) (that the supporting UE has determined based on received SL PRSs) and also their own position estimate (that they may have calculated, or which another UE or node may have calculated and sent to them), and possibly an accuracy indication (e.g., high, medium or low accuracy, or some other accuracy indication) of their position estimate. The calculating node, based on positioning measurements that are received for each of the UEs to be positioned (and possibly based on the position estimates received from supporting UEs), may then determine a position estimate for each UE to be positioned (such as the target UE). The calculating node or calculating UE may then provide or send (e.g., transmit or broadcast, e.g., via SL resources or SL channel) these position estimates for these UEs to be positioned to all nearby UEs and/or to all UEs that are participating in the SL positioning session or to UEs that have requested to receive the UE position estimates.

Also, with respect to the methods of FIGS. 2-4, for example, the target UE may determine (either itself, or obtain from a network node or network entity, e.g., gNB or LMF) a resource allocation (of SL channel or SL resources) for transmitting and receiving SL PRSs (by UEs via SL). The SL positioning configuration or SL PRS configuration transmitted or broadcast by the target UE may also indicate the resource allocation for transmitting/receiving SL PRS, e.g., such as time/frequency resources or their (pre-)configurations: (sub)set(s) of a subframe, slot, subcarrier, resource block, resource element, subchannel, resource pool, bandwidth part, frequency channel, frequency band, etc., and/or a beam or antenna configuration, transmit power, etc. (or other resource allocation-related parameter for SL resources to be used for this SL positioning session).

Also, the methods of any of FIGS. 2-4 may further include: controlling receiving, via a sidelink channel, by the target user node from one or more of the other user nodes (and the other user node transmitting), at least one of the following: an indication of whether or not the other user node would like to participate or join the sidelink positioning session; an indication of whether or not the other user node would like to participate or join the sidelink positioning session as a supporting user node that will transmit and/or receive sidelink positioning reference signals and/or will determine a positioning measurement for the target user node based on received sidelink positioning reference signals; an indication of whether or not the other user node would like to participate or join the sidelink positioning session as a calculating user node that will calculate a position estimate for the target user node based on one or more received positioning measurements; and/or an indication of whether or not the other user node would like to be positioned as part of the sidelink positioning session.

Also, with respect to the methods of any of FIGS. 2-4, the information indicating the sidelink positioning configuration for the sidelink positioning session may further include: information indicating a resource allocation of time/frequency resources for transmitting and/or receiving sidelink positioning reference signals for the positioning session. For example, the information indicating the resource allocation of time/frequency resources for transmitting and/or receiving sidelink positioning reference signals for the positioning session may include, e.g., one or more of the following: a subframe or a subset of a subframe(s), one or more slots, one or more subcarriers, one or more resource blocks, one or more resource elements, one or more subchannels, one or more resource pools, a bandwidth part, a frequency channel, a frequency band, a beam or antenna configuration, and/or a transmit power.

Further examples and features will now be described hereinbelow, for the methods of FIGS. 2-4.

Various techniques are described to enable a target UE (that is in need to be positioned) to coordinate SL positioning based on the SL positioning capability of UEs in its proximity, by exchanging capability information over SL. The target UE may determine the SL positioning configuration, e.g., which may indicate or include a SL positioning method, one or more supporting UEs (which may send and receive SL PRSs and/or perform SL positioning measurements), and the UE (or node) that will calculate the position estimate(s), i.e., the "calculating UE" or calculating node.

An example system may operate as follows (for example): The target UE that wants to position itself may transmit (e.g., broadcasts) a request (e.g., a positioning request, or a SL positioning capability request) to all nearby UEs. The UEs receiving this request, may respond to this request by sending their SL positioning capability information that indicates their SL positioning capabilities (the responding UE's capabilities related to SL positioning), if they would like to participate in positioning. Based on the received SL positioning capability information, the target UE determines the SL positioning configuration for the positioning session to determine a position or location) estimate for the target UE (and possibly for other UEs), which, for example, may include a positioning method, one or more supporting UEs that may send and/or receive SL PRSs and/or may determine positioning measurements, and/or a calculating node (e.g., calculating UE or a calculating network node such as a gNB or LMF) that will determine a position estimate of the target UE based on one or more positioning measurements. The calculating node (e.g., calculating UE) calculates the target UE's position estimate (or position information), and shares this information with (sending this position estimate or position information to) the target UE, and optionally with other involved UEs that may want to know the location of the target UE, for example. In case UEs are under partial network coverage (where some of the UEs include a network connection), the involved UEs may also send/relay their position measurements to the network, where a network entity or network node (e.g., RSU, gNB, LMF, etc.) may calculate the positioning estimate and informs the UEs back (either directly or via relaying through one or more relay UEs that have a network connection). Similarly, UEs can exchange the positioning related messages via sidelink relaying, in case they are not within the communication range of each other (e.g., where the calculating UE is within range of the target UE but not within range of an anchor UE).

Figure 5:
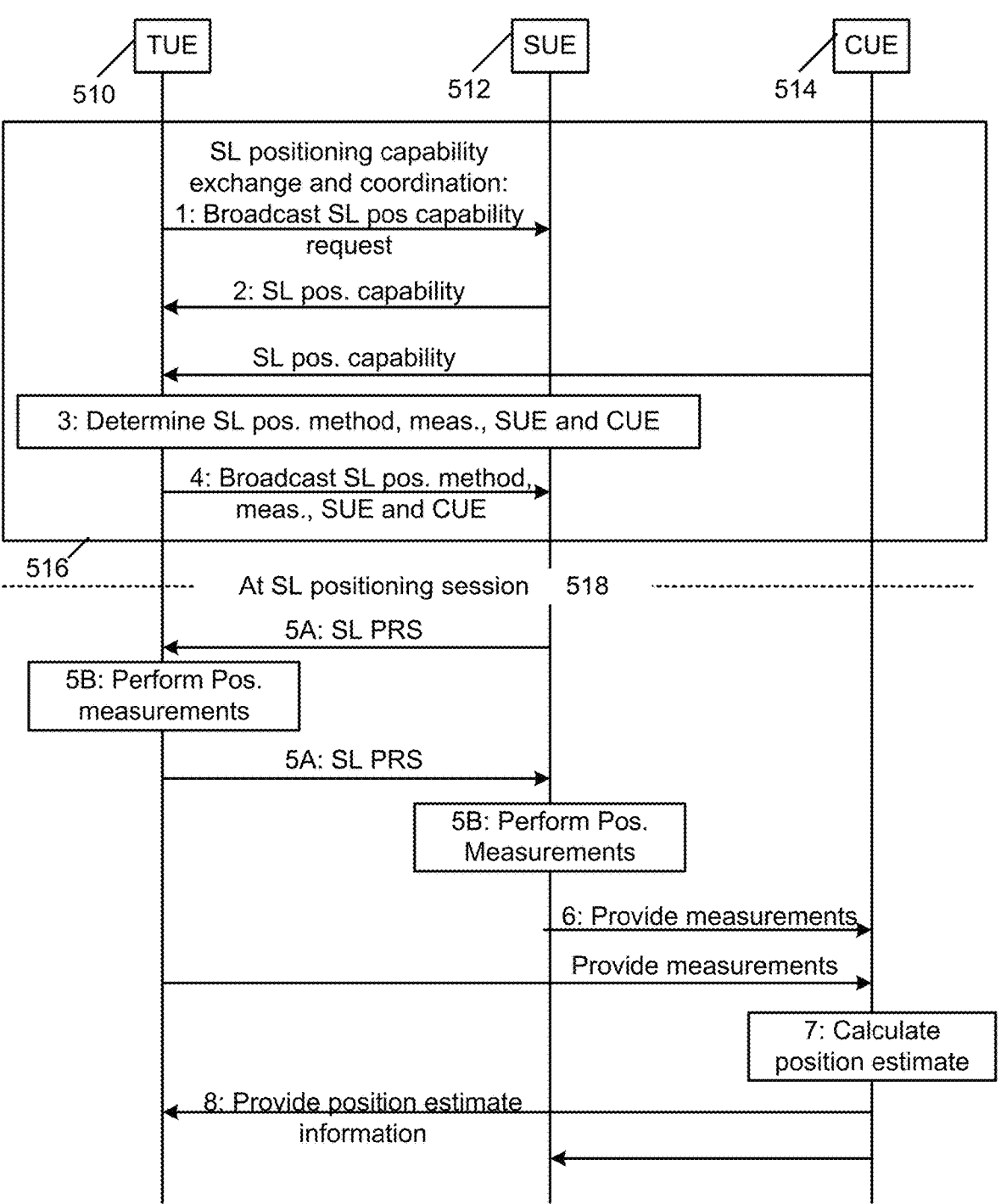
FIG. 5 is a signaling diagram illustrating operation of a system according to the methods of FIGS. 2-4.

FIG. 5 is a signaling diagram illustrating operation of a system according to the methods of FIGS. 2-4. The system shown in FIG. 5 includes a target UE (TUE) 510 to be positioned, a supporting UE (SUE) 512, and a calculating UE (CUE) 514. As noted, target UE (TUE) 510 is a UE that would like to have its position estimated by a calculating node or calculating UE (which may be any UE or network node that is capable of making such calculation, and may even be the target UE); a supporting UE 512 is a UE that is selected (e.g., among those responding UEs (or among candidate supporting UEs) that replied with their SL positioning capability information that indicates their capabilities related to SL positioning), e.g., based on the SL positioning capability information provided by each responding UE, to support the SL positioning session, e.g., where a supporting UE (e.g., SUE 512) may send and/or receive sidelink positioning reference signals (SL PRSs), and/or may determine a positioning measurement for the target UE (e.g., TUE 510) based on a received SL PRSs (e.g., that may be received from the target UE 510); and, a calculating UE (CUE) 514 is a UE that may calculate a position estimate of at least the target UE 510 (and possibly other UEs) based on one or more positioning measurements according to the selected positioning method (e.g., as indicated by the SL positioning configuration provided by the target UE 510 to other UEs). A shown in FIG. 5, a SL positioning capability exchange and coordination 516 includes operations 1-4, while a SL positioning session 518 includes operations 5A, 5B, 6, 7 and 8.

Operation 1 of FIG. 5: The target UE (TUE) 510 (that wants to obtain its position) may transmit (e.g., broadcast) a request (e.g., a positioning request, or a SL positioning capability request) to nearby UEs. Thus, at step 1 of FIG. 5, target UE 510 may, for example, request SL positioning capability information from UEs in its proximity. Also, in the request at step 1, the target UE 510 may indicate one or more requirements or preferences of the SL positioning session, e.g., such as a required QoS (quality of service) or position accuracy requirement for its requested position (or location) estimate. Target UE 510 might further indicate its preference (or even a requirement) of SL positioning methods (TOA, AOA, etc.) to be utilized, as well as Quality of Service (QoS) or accuracy requirements for positioning itself (e.g., high accuracy, low-latency, via a QoS class ID, etc.) so as to proactively deselect or disqualify those UEs from participating in the SL positioning session that are unable to meet the preferred or required positioning method and/or the required or preferred QoS or positioning accuracy (or other requirement). For example, there may be many UEs around target UE, but some of these UEs can be eliminated (or may eliminate themselves) from participating in the SL positioning session, based on required QoS or positioning accuracy, required or preferred positioning method, or other requirement. For example, only a few of the UEs may be able to support a high accuracy (or high QoS) location/position estimate requirement. Thus, those UEs that are unable to meet the preferences and/or requirements of the request may determine that they are unable to meet the requirements of the request (e.g., by comparing their SL positioning capabilities to the requirements of the request (or requirements of the positioning session), and then may simply not respond to the request. This may reduce signaling and overhead for the UEs, as this may eliminate some UEs that are unable to meet a requirement of the request or positioning session, thereby reducing UE overhead and UE signaling over SL resources.

Also, with respect to operation 1 of FIG. 5, the target UE 510 may also indicate in the request a preference to use a relay UE (which has a connection to the network or a network entity, such as a gNB and/or LMF), e.g., such as in a case where target UE 510 may want to perform SL positioning, such as in a case where UEs may be in a partial coverage (some UEs may have a network connection but other UEs may not). Thus, if it is desirable for the position estimate to be calculated by the network, the request might indicate a preference for relay UEs to participate (UEs that also have a network connection) or the request may indicate a preference for supporting UEs (SUEs) that have a network (NW) connection, to allow LMF (or other network entity/ network node) to calculate a position estimate of target UE 510. Also, in a case where none of the responding UEs have a network connection, then a calculating UE 514 may need to calculate position of the target UE 510. For SL positioning, regardless whether a UE or a LMF/network node calculates the position estimate of target UE 510, positioning measurements (for SL positioning) will be performed by UEs via SL, and CUE 514 or network (e.g., gNB or LMF) may perform calculation of the position estimate (e.g., using positioning method as indicated and broadcast as SL configuration). Target UE 510 may indicate its preference towards involving an L2 (layer 2, e.g., MAC layer) or L3 (layer 3, e.g., radio resource control/RRC) Relay for positioning or indicate no preference in an implicit/explicit manner. This may also help down selecting the potential S-UEs. Target UE 510 may indicate its preference to involve other (relay) UEs for positioning that have already an established PC5 connection (SL connection) with the target UE 510. Target UE 510 may indicate its preference over the RAT (radio access technology) of the (relay) UEs to deselect some of the potential UE(s) for positioning, especially in case of UE-to-network relays. E.g., if high accuracy is not needed, LTE Uu links maybe de-prioritized/down-selected (deselected). This may allow distribution of the load for estimating positions between different RATs, e.g., LTE, NR/5G and may also enhance backward compatibility aspects. The request may be broadcast/groupcast, or may be unicast to each UE individually.

Operation 2 of FIG. 5: At operation 2 of FIG. 5, any UE (e.g., any candidate supporting UE, such as SUE 512, FIG. 5) receiving the request (via operation 1), may respond by sending its SL positioning capability information to target UE 510 (FIG. 5) (to indicate one or more of its SL positioning capabilities), and thus, target UE 510 may receive the SL positioning capability information from other UEs. The SL capability information or capabilities of a UE may include (or may be based on, or may indicate) one or more of the following, e.g., listed within A)-F), below, as some illustrative examples:

A) Prior to operation 2, a SUE 512 may determine if it wants to participate in SL positioning session, depending on several factors that may include (these may also be considered as capabilities of the UE):

SL physical or higher layer measurements based on received SL signals from other UEs, such as RSRP, RSRQ, SINR, CSI, CBR, CR, and Doppler shift/ spread (maybe this UE is too far away, and proactively to not participate in this positioning request, since it cannot provide requested QoS; or SL channel is quite busy);

Accuracy of its own position and positioning measurements including coarse range/position information and error margins;

SL line-of-sight conditions (e.g., to target UE) based on channel measurements and sensor data such as acquired via camera, lidar, etc.;

Availability of its energy status (or the energy status of the UE), or availability or status of its discontinuous reception/transmission cycles; the UE's connection state to the network (RRC idle, inactive, etc., indicating whether the UE is connected to the network or not);

Other capability or status information, such as, e.g.: SL load, such as defined in terms of one or more of the following: Number of PC5 connections to Remote UEs currently being actively used for relaying, Resource pool usage or capacity (including physical layer metrics such as channel busy ratio/CBR or channel occupancy ratio/CR), Number of remote UEs being served by the relay UE, Free bandwidth (or achievable bit rate) that relay UE can provide for relay traffic, (Relay) UE taking the information provided by the network into account, e.g., via the gNB indication as "high" or "low" load, and/or Up to UE implementation;

B) SL positioning capability information may include, for example:

Whether UE can receive/transmit SL PRS or other reference signals used for positioning;

Supported SL positioning methods by the UE: Ranging and/or positioning

Absolute and/or relative positioning;

UL/DL-only, SL-only or SL-assisted positioning;

Power-based measurements for positioning (RSRP, SINR, etc.);

Time-based measurements for positioning (time of arrival, time difference of arrival, round-trip time, etc.);

Frequency-based measurements (e.g., Doppler shift estimation, etc.);

Angle-based measurements for positioning (angle of departure, angle of arrival, etc.);

Carrier phase measurements optionally including capability indication to perform integer ambiguity resolution for relative positioning or just phase locking based relative movement;

Supported (pre-)configurations for transmitting/receiving SL PRS;

Value, range or ID of supported parameters for transmitting/receiving SL PRS, such as SL PRS bandwidth, resource configuration (comb structure, repetition, etc.), beam or antenna configuration, transmit power, etc.

Whether UE is synchronized, and its synchronization source;

Whether UE can calculate positioning estimates based on measurements and if the UE can provide relative or absolute position based on these measurements;

UE's own position knowledge, with accuracy/error margin;

UE energy level, required for positioning;

Whether UE supports (SL) relaying capability,

C) UEs might further indicate:

whether they have an active relay connection;

whether they are connected to network;

D) UEs might further indicate whether they would also like to position themselves, or want to know the position of other UEs (e.g., the target UE), as well as QoS for positioning, so that the target UE might coordinate the positioning session also taking that into account;

E) UEs might further indicate whether they are also in another positioning session, optionally providing the involved target UE and anchor UE IDs.

F) The response message could be broadcast/groupcast or unicast to target UE.

Operation 3 of FIG. 5: Based on the received capability information of operation 2, as well as any other (reported) measurements such as SL load conditions, the target UE may determine a SL positioning configuration, e.g., which may include one or more of the following, for example:

SL positioning method to be used (e.g., sidelink time-difference of arrival);

SL PRS configuration for transmission and reception;

SL PRS measurement configurations;

any other target UE(s) and UEs requesting it (based on indication coming from the responses in operation 2);

supporting UE(s);

calculating UE(s);

depending on the received information and relative location of supporting UEs, the target UE may select the supporting UEs by avoiding the supporting UEs in the direction where the geometric dilution of precision would be present, e.g., targeting to select UEs spread apart rather than close together for more precise location estimate.

Operation 4 of FIG. 5: Target UE informs other UEs about the determined SL positioning configuration for positioning session (including configurations, selected UEs, etc.).

Different information could be carried in different messages, e.g., SL PRS configuration sent in a different message than the message indicating the selected UE(s);

The information could be broadcast/groupcast or unicast to each UE individually;

Operation 5A of FIG. 5: Supporting UEs (such as SUE 512 and/or possibly target UE (TUE 510)) transmit configured sidelink positioning reference signals (SL PRSs) to other supporting UEs and/or to target UE (TUE) 510. Thus, each supporting UE (e.g., such as SUE 512) may transmit SL PRSs to other supporting UEs, and/or receive SL PRSs from other supporting UEs.

Operation 5B of FIG. 5: Supporting UEs (e.g., such as SUE 512) may determine positioning measurements for the target UE (TUE) 510, based on received SL PRSs.

With respect to operations 5A and 5B, as noted, target UE (TUE 510) may be (or operate as, or perform at least some function of) a supporting UE, and thus, TUE 510 may transmit and/or receive SL PRSs. As shown in FIG. 5, TUE 510 may receive a SL PRS from SUE 512, and TUE 510 may determine a positioning measurement (of itself) based on SL PRSs received from one or more supporting UEs (e.g., such as from SUE 512).

Operation 6 of FIG. 5: UEs provide their positioning measurements to the calculating UE. For example, as shown in FIG. 5, TUE 510 and SUE 512 provides their positioning measurements to CUE 514.

Operation 7 of FIG. 5: Calculating UE (e.g., CUE 514, FIG. 5) calculates the position estimate of target UE(s) (e.g., including TUE 510) based on the collected/received positioning measurements (e.g., based on positioning measurements received by CUE 514 from TUE 510 and SUE 512 at operation 6 of FIG. 5).

Operation 8 of FIG. 5: Calculating UE (e.g., CUE 514) provides the position estimate information of target UE(s) (e.g., of TUE 510) to the requesting UEs (e.g., to TUE 510, and possibly to other or all UEs that participated in the SL positioning session, or to all or any UEs that requested the positioning estimate information, for example). Thus, TUE 510 receives the position estimate of the TUE 510 from the CUE 514;

The position estimate information (indicating the position estimate of the target UE 510) may be broadcast/groupcast or unicast to each UE individually;

Position estimate information may indicate, e.g., a calculated relative distance or direction, and/or absolute position of the target UE(s);

The position estimate information could further contain additional positioning-related information such as estimates of velocity, direction, heading, orientation, acceleration of the target UE(s).

Also, with respect to FIG. 5, the target UE may also determine to use network for calculating the positioning estimates instead of a calculating UE. This could be the case, for example, where none of the UEs having this capability, but (at least one of them) has a connection to network either directly or via relay, which they indicate this to target UE in operation 2. In this case, UEs report their positioning measurements to network (some may report directly, and some may report indirectly via relay UE), instead of a calculating UE, and the network calculates the position estimates, and informs the UEs. The calculation at the network side of positioning estimates may be performed at the gNB, RSU, LMF, or any other logical or physical entity at the network. The information exchange in this case could be relayed/transmitted between the UE(s) and the network entities.

Also, with respect to FIG. 5, in case the UEs in the direct proximity of target UE cannot meet the requested positioning service, or are not willing or interested in participating in this SL positioning session, these UEs may still forward the target UE's request to their surroundings (to their nearby UEs) in order to find other suitable/capable UEs for positioning the target UE. Target UE may enable this forwarding (of the request) with an indication when sending its request in operation 1. The information exchange among the involved UEs in this case could be relayed among the UE(s) (and/or network entities) as they may not be in direct proximity of each other.

Some further examples will be provided.

Example 1. A method may include:

controlling transmitting (e.g., 210, FIG. 2), via a sidelink channel, by a target user node (e.g., TUE 510, FIG. 5) to be positioned to one or more other user nodes, a request associated with sidelink positioning. For example, as shown in FIG. 5, the target UE (TUE) 510 (that wants to obtain its position) may transmit (e.g., broadcast) a request (e.g., a positioning request, or a SL positioning capability request) to nearby UEs. Thus, at step 1 of FIG. 5, target UE 510 may, for example, request SL positioning capability information from UEs in its proximity. Also, in the request at step 1, the target UE 510 may indicate one or more requirements or preferences of the SL positioning session, e.g., such as a required QoS (quality of service) or position accuracy requirement for its requested position (or location) estimate. Target UE 510 might further indicate its preference (or even a requirement) of SL positioning methods (TOA, AOA, etc.) to be utilized, as well as Quality of Service (QoS) or accuracy requirements for positioning itself (e.g., high accuracy, low-latency, via a QoS class ID, etc.).

controlling receiving (220, FIG. 2), via a sidelink channel, by the target user node (e.g., target UE 510, FIG. 5) from one or more of the other user nodes, sidelink positioning capability information of the user node indicating one or more sidelink positioning capabilities of the other user node. For example, at operation 2 of FIG. 5, any UE (e.g., any candidate supporting UE, such as SUE 512, FIG. 5) receiving the request (via operation 1), may respond by sending its SL positioning capability information to target UE 510 (FIG. 5) (to indicate one or more of its SL positioning capabilities), and thus, target UE 510 may receive the SL positioning capability information from other UEs.

determining (e.g., 230, FIG. 2), by the target user node (e.g., TUE 510, FIG. 5) based on the sidelink positioning capability information received from the one or more other user nodes, a sidelink positioning configuration for a sidelink positioning session to determine a position estimate of the target user node (e.g., TUE 510, FIG. 5), the sidelink positioning configuration identifying at least a sidelink positioning method, one or more supporting user nodes (e.g., SUE 512) among the other user nodes to transmit and receive sidelink positioning reference signals for obtaining one or more positioning measurements of the target user node (e.g., TUE 510), and a calculating node (e.g., CUE 514, or a calculating network node) that will calculate a position estimate of the target user node based on the one or more positioning measurements received from one or more supporting user nodes. For example, operation 3 of FIG. 5: Based on the received capability information of operation 2 of FIG. 5, as well as any other (reported) measurements such as SL load conditions, the target UE (TUE 510, FIG. 5) may determine a SL positioning configuration for the SL positioning session.

controlling transmitting (240, FIG. 2), via a sidelink channel, by the target user node (TUE 510, FIG. 5) to at least the one or more other user nodes (e.g., SUE 512) that provided their sidelink positioning capability information, information indicating the sidelink positioning configuration for the sidelink positioning session. For example, operation 4 of FIG. 5: Target UE (TUE 510) informs other UEs (e.g., SUE 512) about the determined SL positioning configuration for positioning session (including configurations, UEs selected for supporting UEs and calculating UE, etc.) and, controlling receiving (250, FIG. 2), by the target user node (TUE 510, FIG. 5) from the calculating node (e.g., CUE 514, FIG. 5), a position estimate of the target user node, based on the one or more positioning measurements of the target user node (TUE 510, FIG. 5). For example, Operation 8 of FIG. 5: Calculating UE (e.g., CUE 514) provides the position estimate information of target UE(s) (e.g., of TUE 510) to the requesting UEs (e.g., to TUE 510, and possibly to other or all UEs that participated in the SL positioning session, or to all or any UEs that requested the positioning estimate information, for example). Thus, for example, TUE 510 receives the position estimate of the TUE 510 from the CUE 514 (or other calculating node).

Example 2. The method of example 1, wherein the request comprises at least one of: a positioning request, which requests participation in a sidelink positioning session, by the other user nodes (e.g., SUE 512, FIG. 5), to obtain a position estimate of the target user node (e.g., TUE 510, FIG. 5); and/or a request for sidelink positioning capability information of the one or more other user nodes (e.g., SUE 512, FIG. 5).

Example 3. The method of any of examples 1-2, wherein the calculating node comprises at least one of: a calculating user node (e.g., CUE 514, FIG. 5); or a calculating network node or location management function (e.g., a gNB or LMF).

Example 4. The method of any of examples 1-3, further comprising: controlling transmitting and/or receiving, by the target user node (e.g., TUE 510, FIG. 5) from one or more of the other user nodes via sidelink channel, a sidelink positioning reference signal (SL PRS); determining, by the target user node based on the sidelink positioning reference signal received from one or more of the other user nodes (e.g., SUE 512), a positioning measurement for the target user node; and controlling transmitting, by the target user node to the calculating node (e.g., CUE 514, FIG. 5) the positioning measurement of the target user node determined by the target user node.

Example 5. The method of any of examples 1-4, further comprising: controlling transmitting, by the target user node (e.g., TUE 510) to at least one or more of the other user nodes (e.g., SUE 512, FIG. 5) via a sidelink channel, a sidelink positioning reference signal, to enable one or more of the other user nodes to determine a positioning measurement of the target user node (e.g., TUE 510).

Example 6. The method of any of examples 1-5, wherein the target user node (e.g., TUE 510) is also the calculating node (e.g., the TUE 510 and CUE 514 are provided as a single UE or node, that transmits the request and calculates the position estimate).

Example 7. The method of any of examples 1-6, wherein the request transmitted by the target user node comprises at least one of: a required or preferred Quality of Service or accuracy of the position estimate of the target user node; and/or one or more sidelink positioning methods that may be used to position the target user node. For example, the request transmitted by the target UE may indicate one or more requirements of the positioning session for the target UE, such as, for example, a required QoS or accuracy of the position estimate, and/or one or more positioning method(s) that may be used. For example, this may allow one or more of the other UEs to compare these positioning session requirements and/or preferences to its SL positioning capabilities, so the other UE may determine if it is able to (or should) participate in the positioning session. For example, if a request indicates that a high accuracy positioning estimate will be required, and an AOA positioning method will be used, the other UE (receiving the request) may then compare these positioning session requirements to its capabilities. If the other UE can perform AOA positioning measurements at the indicated accuracy or QoS, then the other UE may then respond to the request (at operation 220)

with its SL positioning capability information. Otherwise, for example, if the other UE (that received the request) is unable to comply or participate in the positioning session based on the indicated requirements (e.g., the other UE is unable to perform positioning measurements for AOA, or is unable to perform positioning measurements for the indicated high accuracy), then the other UE may simply not respond to the request with its SL positioning capability information, or alternatively, may reply with its SL positioning capability information, e.g., to allow the target UE to adjust or change the required parameters (e.g., change the positioning method and/or accuracy in this example), if there are not enough other UEs that have indicated they can participate based on the indicated or preferred requirements or criteria, for example.

Example 8. The method of any of examples 1-7, wherein the request transmitted by the target user node comprises: a requirement or preference to include or use a relay user node for the sidelink positioning session, where the relay user node is at least one of: 1) a user node that has a connection to the network and is able to operate as a user node-to-network relay to communicate or forward information received from a user node to the network and/or is able communicate with both user nodes and the network, and/or 2) a user node that is able to operate as a user node-to-user node relay that is able to communicate with and/or forward information to a user node that can operate as a user node-to-network relay. For example, the target UE may prefer to have the network (e.g., LMF or gNB) perform the position estimate (as the calculating node). However, the target UE and/or one or more other UEs may not have a connection to the network. Thus, in in such case (as an example), using the LMF as a calculating node may require at least one of the supporting UEs to be a relay UE, e.g., either 1) a UE that has a connection to the network or be able to forward information to a UE that has a connection to the network (e.g., so that positioning measurements may be forwarded to the calculating LMF via such relay UE, and/or a position estimate be returned back to the target UE via such relay UE); or 2) a UE that is able to communicate with other UE(s) that have a network connection. There may be other scenarios where it may be useful to have a relay UE participate in the positioning session.

Example 9. The method of any of examples 1-8, wherein the sidelink positioning capability information received by the target user node (e.g., TUE 510, FIG. 5) from the one or more other user nodes (e.g., SUE 512, FIG. 5) comprises information indicating at least one of the following for the other user node: whether the other user node can transmit and/or receive a sidelink positioning reference signal or other reference signal used for positioning; one or more supported configurations or transmitting and/or receiving sidelink positioning reference signals; one or more supported sidelink positioning methods that are supported by the other user node; whether the other user node is synchronized and an indication of its synchronization source; whether the other user node can calculate a position estimate of the target user node, and/or whether the other user node can calculate an absolute or relative position of the target user node; the other user node's knowledge of its own position; an energy status or level that is required for the other user node for positioning (e.g., a UE battery level, or amount of energy or batter power that is remaining and/or that is required to participate in the positioning session); whether the other user node supports sidelink relaying of information between a user node and the network; whether the other user node is connected to the network (e.g., is in a RRC connected state to a gNB or other network node and/or connected to a LMF); whether the other user node would also like to obtain a position of itself (this information may also be provided to TUE 510, so that position estimate may be provided for multiple UEs); whether the other user node would like to obtain or receive a position estimate of one or more user nodes (e.g., so that CUE 514 may share the position estimate for the UE(s) with at least all UEs that would like to receive the UE position estimates); whether the other user node is participating in another positioning session, and/or identifying a target user node for another positioning session for which the other user node is participating.

Example 10. The method of any of examples 1-9, wherein the request comprises: information indicating whether a user node may forward the request to another user node.

Example 11. The method of any of examples 1-10, further comprising controlling receiving, via a sidelink channel, by the target user node (e.g., TUE 510, FIG. 5) from one or more of the other user nodes (e.g., SUE 512), at least one of the following: an indication of whether or not the other user node would like to participate or join the sidelink positioning session; an indication of whether or not the other user node would like to participate or join the sidelink positioning session as a supporting user node that will transmit and/or receive sidelink positioning reference signals and/or will determine a positioning measurement for the target user node based on received sidelink positioning reference signals; an indication of whether or not the other user node would like to participate or join the sidelink positioning session as a calculating user node that will calculate a position estimate for the target user node based on one or more received positioning measurements; and/or an indication of whether or not the other user node would like to be positioned as part of the sidelink positioning session.

Example 12. The method of any of examples 1-11, wherein the information indicating the sidelink positioning configuration for the sidelink positioning session further comprises: information indicating a resource allocation of time/frequency resources for transmitting and/or receiving sidelink positioning reference signals for the positioning session.

Example 13. The method of example 12, wherein the information indicating the resource allocation of time/frequency resources for transmitting and/or receiving sidelink positioning reference signals for the positioning session comprises one or more of the following: a subframe or a subset of a subframe(s), one or more slots, one or more subcarriers, one or more resource blocks, one or more resource elements, one or more subchannels, one or more resource pools, a bandwidth part, a frequency channel, a frequency band, a beam or antenna configuration, and/or a transmit power. These are some illustrative examples information indicating a resource allocation of resources.

Example 14. An apparatus comprising means (e.g., transceiver 1202A, processor 1204 and/or memory 1206, FIG. 6) for performing the method of any of examples 1-13.

Example 15. An apparatus comprising: at least one processor (e.g., processor 1204, FIG. 6); and at least one memory (e.g., memory 1206, FIG. 6) including computer program code; the at least one memory and the computer program code configured to, with the at least one processor, cause the apparatus at least to perform the method of any of examples 1-13.

Example 16. An apparatus comprising: at least one processor (e.g., processor 1204, FIG. 6); and at least one memory (e.g., memory 1206, FIG. 6) including computer program code; the at least one memory and the computer program code configured to, with the at least one processor, cause the apparatus at least to: control transmitting, via a sidelink channel, by a target user node to be positioned to one or more other user nodes, a request associated with sidelink positioning; control receiving, via a sidelink channel, by the target user node from one or more of the other user nodes, sidelink positioning capability information of the user node indicating one or more sidelink positioning capabilities of the other user node; determine, by the target user node based on the sidelink positioning capability information received from the one or more other user nodes, a sidelink positioning configuration for a sidelink positioning session to determine a position estimate of the target user node, the sidelink positioning configuration identifying at least a sidelink positioning method, one or more supporting user nodes among the other user nodes to transmit and receive sidelink positioning reference signals for obtaining one or more positioning measurements of the target user node, and a calculating node that will calculate a position estimate of the target user node based on the one or more positioning measurements received from one or more supporting user nodes; control transmitting, via a sidelink channel, by the target user node to at least the one or more other user nodes that provided their sidelink positioning capability information, information indicating the sidelink positioning configuration for the sidelink positioning session; and control receiving, by the target user node from the calculating node, a position estimate of the target user node, based on the one or more positioning measurements of the target user node. (See examples and further details described above with reference to Example 1).

Example 17. A method comprising: controlling receiving (310, FIG. 3), via a sidelink channel, by a first user node (e.g., SUE 512, FIG. 5) from a target user node (e.g., TUE 510, FIG. 5) to be positioned, a request associated with sidelink positioning; in response to receiving the request, determining (320, FIG. 3), by the first user node (e.g., SUE 512, FIG. 5), based on sidelink positioning capabilities of the first user node and/or the request, that the first user node is able to participate in a positioning session for the target user node; controlling transmitting (330, FIG. 3), via a sidelink channel, by the first user node to the target user node, sidelink positioning capability information of the first user node indicating one or more of the sidelink positioning capabilities of the first user node; controlling receiving (340, FIG. 3), via a sidelink channel, by the first user node from the target user node, information indicating a sidelink positioning configuration for the sidelink positioning session, the sidelink positioning configuration identifying at least a sidelink positioning method, one or more supporting user nodes (e.g., including at least SUE 512) including the first user node (e.g., including at least SUE 512) to transmit and receive sidelink positioning reference signals to obtain one or more positioning measurements of the target user node (e.g., TUE 510, FIG. 5), and a calculating node (e.g., CUE 514, FIG. 5) that will calculate a position estimate of the target user node based on the one or more positioning measurements; controlling receiving (350, FIG. 3) a sidelink positioning reference signal (SL PRS) from the target user node (e.g., TUE 510, FIG. 5); determining (360), by the first user node (e.g., SUE 512, FIG. 5) based on the sidelink positioning reference signal from the target user node (e.g., TUE 510, FIG. 5), a positioning measurement of the target user node; and controlling transmitting (370, FIG. 3), by the first user node (e.g., SUE 512, FIG. 5) to the calculating node (e.g., CUE 514, FIG. 5), one or more positioning measurements including the determined positioning measurement of the target user node. (See examples and further details described above with reference to Example 1).

Example 18. The method of example 17, further comprising: controlling transmitting, by the first user node (e.g., SUE 512) to at least the target user node (e.g., TUE 510) via a sidelink channel, a sidelink positioning reference signal (SL PRS), to enable the target user node to determine a positioning measurement of the target user node.

Example 19. The method of any of examples 17-18, wherein the controlling transmitting, by the first user node to the calculating node, the positioning measurement comprises: controlling transmitting, by the first user node to the calculating node, the positioning measurement of the target user node and a position estimate of the first user node. Thus, for example, the SUE 512 (supporting UE) may obtain its position, and then may transmit both the determined positioning measurement for the target UE (e.g., for TUE 510) as well as its own position estimate) to the calculating node or calculating UE (e.g., to CUE 514, FIG. 5).

Example 20. The method of any of examples 17-19, wherein the request comprises at least one of: a positioning request, which requests participation in a sidelink positioning session, by the other user nodes, to obtain a position estimate of the target user node; and/or a request for sidelink positioning capability information of the one or more other user nodes. Thus, the request may be included as (or as part of) a message that requests UEs to participate in a SL positioning session, or included as (or as part of) a message that requests capability information from the supporting UEs, such as requesting SL positioning capabilities of the SUEs, for example.

Example 21. The method of any of examples 17-20, wherein the calculating node comprises at least one of: a calculating user node (e.g., a CUE 514, FIG. 5); a calculating network node or location management function (e.g., a gNB that calculates the position estimate of the TUE 510, or a LMF that calculates the position estimate of the TUE 510), for example.

Example 22. The method of any of examples 17-21, wherein the request comprises at least one of: a required or preferred Quality of Service or accuracy of the position estimate of the target user node; and/or one or more sidelink positioning methods that may be used to position the target user node.

Example 23. The method of example 22, wherein the determining that the first user node (e.g., SUE 512, FIG. 5) can or is able to participate in a positioning session for the target user node (e.g., TUE 510) comprises one or more of the following: determining, by the first user node, that the first user node can meet or satisfy, or assist in meeting, the required or preferred Quality of Service or accuracy of the position estimate, indicated by the request; and/or determining, by the first user node, that the first user node can perform, or can provide a positioning measurement that will assist in performing, at least one of the one or more sidelink positioning methods that may be used to position the target user node.

Example 24. The method of any of examples 17-23, wherein the determining, by the first user node (e.g., SUE 512, FIG. 5), based on sidelink positioning capabilities of the first user node and/or the request, that the user node is able to participate in a positioning session for the target user node comprises: determining, by the first user node, that the user node is able to participate in a positioning session for the target user node, based on a comparison, by the first user node, of one or more sidelink positioning capabilities of the first user node, one or more requirements or preferences of the positioning session indicated by the request, wherein the sidelink positioning capabilities of the first user node comprise one or more of the following: whether the first user node can transmit and/or receive a sidelink positioning reference signal or other reference signal used for positioning; one or more supported configurations or transmitting and/or receiving sidelink positioning reference signals; one or more supported sidelink positioning methods that are supported by the first user node; whether the first user node is synchronized and an indication of its synchronization source; whether the first user node can calculate a position estimate of the target user node, and/or whether the first user node can calculate an absolute or relative position of the target user node; the first user node's knowledge of its own position; an energy status or level of the first user node and/or an energy status or level that is required for the first user node for positioning; whether the first user node supports sidelink relaying of information between a user node and the network; whether the first user node is connected to the network; whether the first user node would also like to obtain a position of itself; whether the first user node would like to obtain or receive a position estimate of one or more user nodes; whether the first user node is participating in another positioning session, and/or identifying a target user node for another positioning session for which the first user node is participating.

Example 25. The method of any of examples 17-24, further comprising: controlling transmitting, via a sidelink channel, by the first user node (e.g., SUE 512, FIG. 5) to at least the target user node (e.g., TUE 510, FIG. 5), sidelink positioning capability information of the first user node indicating one or more of the sidelink positioning capabilities of the first user node.

Example 26. The method of any of examples 17-25, further comprising controlling transmitting, via a sidelink channel, by the first user node (e.g., SUE 512, FIG. 5) to the target user node (e.g., TUE 510, FIG. 5), at least one of the following: an indication of whether or not the first user node would like to participate or join the sidelink positioning session; an indication of whether or not the first user node would like to participate or join the sidelink positioning session as a supporting user node that will transmit and/or receive sidelink positioning reference signals and/or will determine a positioning measurement for the target user node based on received sidelink positioning reference signals; an indication of whether or not the first user node would like to participate or join the sidelink positioning session as a calculating user node that will calculate a position estimate for the target user node based on one or more received positioning measurements; and/or an indication of whether or not the first user node would like to be positioned as part of the sidelink positioning session.

Example 27. The method of any of examples 17-26, wherein the information indicating the sidelink positioning configuration for the sidelink positioning session further comprises: information indicating a resource allocation of time/frequency resources for transmitting and/or receiving sidelink positioning reference signals for the positioning session.

Example 28. The method of example 27, wherein the information indicating the resource allocation of time/frequency resources for transmitting and/or receiving sidelink positioning reference signals for the positioning session comprises one or more of the following: a subframe or a subset of a subframe(s), one or more slots, one or more subcarriers, one or more resource blocks, one or more resource elements, one or more subchannels, one or more resource pools, a bandwidth part, a frequency channel, a frequency band, a beam or antenna configuration, and/or a transmit power. These are some examples of resources or information identifying resources.

Example 29. An apparatus comprising means (e.g., processor 1204, transceiver 1202A and/or memory 1206, FIG. 6) for performing the method of any of examples 17-28.

Example 30. An apparatus comprising: at least one processor (e.g., processor 1204, FIG. 6); and at least one memory (e.g., memory 1206, FIG. 6) including computer program code; the at least one memory and the computer program code configured to, with the at least one processor, cause the apparatus at least to perform the method of any of examples 17-28.

Example 31. An apparatus comprising: at least one processor (e.g., processor 1204, FIG. 6); and at least one memory (e.g., memory 1206, FIG. 6) including computer program code; the at least one memory and the computer program code configured to, with the at least one processor, cause the apparatus at least to: control receiving, via a sidelink channel, by a first user node from a target user node to be positioned, a request associated with sidelink positioning; in response to receiving the request, determine, by the first user node, based on sidelink positioning capabilities of the first user node and/or the request, that the first user node is able to participate in a positioning session for the target user node; control transmitting, via a sidelink channel, by the first user node to the target user node, sidelink positioning capability information of the first user node indicating one or more of the sidelink positioning capabilities of the first user node; control receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and a calculating node that will calculate a position estimate of the target user node based on the one or more positioning measurements; control receiving a sidelink positioning reference signal from the target user node; determine, by the first user node based on the sidelink positioning reference signal from the target user node, a positioning measurement of the target user node; and control transmitting, by the first user node to the calculating node, one or more positioning measurements including the determined positioning measurement of the target user node.

Example 32. A method comprising: controlling receiving (410, FIG. 4), via a sidelink channel, by a first user node (e.g., CUE 514, FIG. 5) from a target user node (TUE 510, FIG. 5) to be positioned, a request associated with sidelink positioning; determining (420, FIG. 4), by the first user node (e.g., CUE 514, FIG. 5), based on status and/or capabilities of the first user node and/or the request, that the first user node can participate in a positioning session for the target user node as a calculating user node that calculates a position estimate of the target user node; controlling transmitting (430, FIG. 4), via a sidelink channel, by the first user node (e.g., CUE 514, FIG. 5) to the target user node (e.g., TUE 501, FIG. 5), sidelink positioning capability information of the first user node indicating one or more sidelink positioning capabilities of the first user node, including an indication that the first user node can calculate a position estimate of the target user node; controlling receiving (440, FIG. 4), via a sidelink channel, by the first user node (e.g., CUE 514, FIG. 5) from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and that the first user node is assigned as a calculating node that will calculate a position estimate of the target user node based on the one or more positioning measurements; controlling receiving (450, FIG. 4), by the first user node (e.g., CUE 514, FIG. 5), a positioning measurement and/or a position estimate of a user node (e.g., of SUE 512), from one or more of the supporting user nodes (e.g., SUE 512, FIG. 5); determining (460, FIG. 4), by the first user node (e.g., CUE 514, FIG. 5) based on the positioning measurement(s) and/or position estimate(s) received from the one or more supporting user nodes (e.g., SUE 510, FIG. 5), a position estimate of the target user node (e.g., TUE 510, FIG. 5) and, controlling transmitting (470, FIG. 4), by the first user node (e.g., CUE 514, FIG. 5) to the target user node (e.g., TUE 510, FIG. 5), the position estimate of the target user node.

Example 33. The method of example 32, wherein the first user node is a calculating user node that determines a position estimate of at least the target user node (e.g., a calculating UE or CUE, e.g., CUE 514, FIG. 5).

Example 34. The method of any of examples 32-33, further comprising at least one of the following: controlling transmitting, by the first user node (e.g., CUE 514, FIG. 5) to at least the target user node (e.g., TUE 510, FIG. 5) via a sidelink channel, a sidelink positioning reference signal, to enable the target user node to determine a positioning measurement of the target user node; and/or controlling receiving, by the first user node from the target user node via a sidelink channel, a sidelink positioning reference signal, to enable the first user node to determine a positioning measurement of the target user node.

Example 35. The method of any of examples 32-34: wherein the position estimate received for one or more of the supporting user nodes includes an accuracy indication (e.g., high accuracy, medium accuracy or low accuracy) for the position estimate.

Example 36. An apparatus comprising means (e.g., processor 1204, transceiver 1202A, and/or memory 1206, FIG. 6) for performing the method of any of examples 32-35.

Example 37. An apparatus comprising: An apparatus comprising: at least one processor (e.g., processor 1204, FIG. 6); and at least one memory (e.g., memory 1206, FIG. 6) including computer program code; the at least one memory and the computer program code configured to, with the at least one processor, cause the apparatus at least to perform the method of any of examples 32-35.

Example 38. An apparatus comprising: at least one processor (e.g., processor 1204, FIG. 6); and at least one memory (e.g., memory 1206, FIG. 6) including computer program code; the at least one memory and the computer program code configured to, with the at least one processor, cause the apparatus at least to control receiving, via a sidelink channel, by a first user node from a target user node to be positioned, a request associated with sidelink positioning; determine, by the first user node, based on status and/or capabilities of the first user node and/or the request, that the first user node can participate in a positioning session for the target user node as a calculating user node that calculates a position estimate of the target user node; control transmitting, via a sidelink channel, by the first user node to the target user node, sidelink positioning capability information of the first user node indicating one or more sidelink positioning capabilities of the first user node, including an indication that the first user node can calculate a position estimate of the target user node; control receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and that the first user node is assigned as a calculating node that will calculate a position estimate of the target user node based on the one or more positioning measurements; control receiving, by the first user node, a positioning measurement and/or a position estimate of a user node, from one or more of the supporting user nodes; determine, by the first user node based on the positioning measurement(s) and/or position estimate(s) received from the one or more supporting user nodes, a position estimate of the target user node; and control transmitting, by the first user node to the target user node, the position estimate of the target user node.

Figure 6:
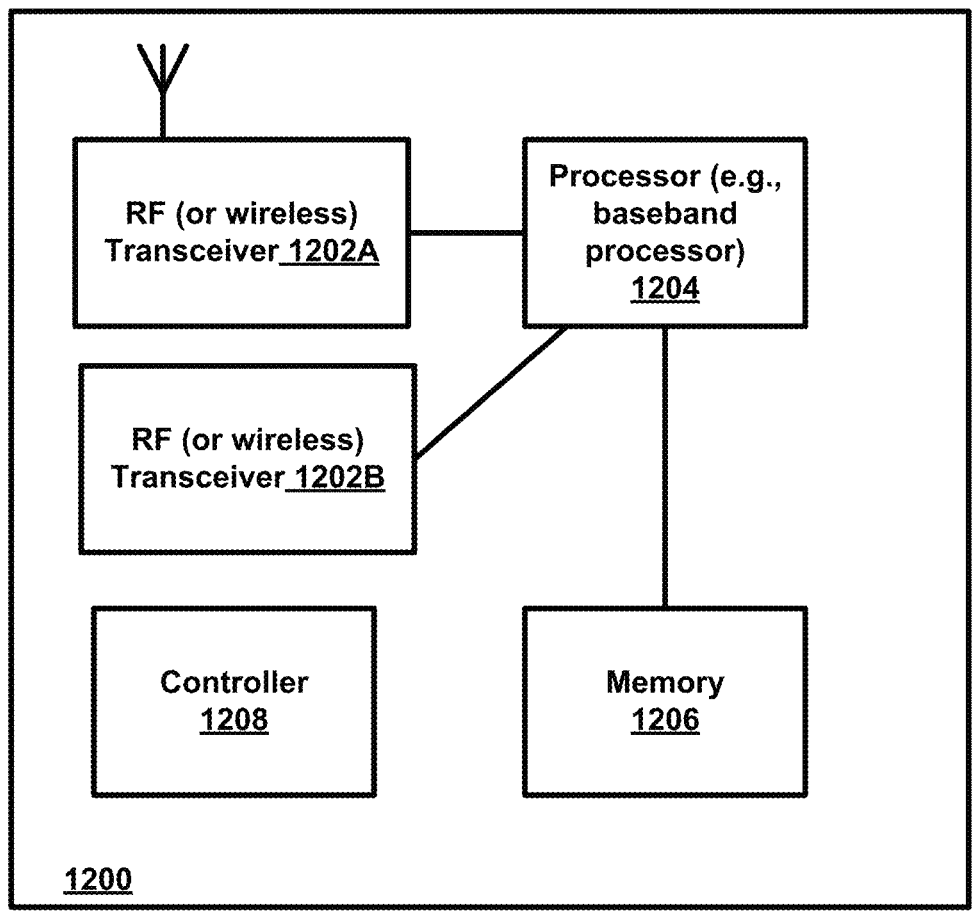
FIG. 6 is a block diagram of a wireless station or node (e.g., network node, user node or UE, relay node, or other node).

FIG. 6 is a block diagram of a wireless station (e.g., user node, network node, or other node) 1200 according to an example embodiment. The wireless station 1200 may include, for example, one or more (e.g., two as shown in FIG. 6) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 6, a controller (or processor) 1208 may execute software and instructions, and may provide overall control for the station 1200, and may provide control for other systems not shown in FIG. 6, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G may be similar to that of LTE-advanced. 5G is likely to use multiple input-multiple output (MIMO) antennas, many more base stations or nodes than LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node may be operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a standalone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a backend component, e.g., as a data server, or that includes a middleware component, e.g., an application server, or that includes a frontend component, e.g., a client computer having a graphical user interface or a Web browser through which a user can interact with an embodiment, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method for a target user node, comprising:
controlling transmitting, via a sidelink channel, to one or more other user nodes, a request associated with sidelink positioning;
controlling receiving, via a sidelink channel, by the target user node from at least one of the one or more other user nodes, sidelink positioning capability information of the at least one user node indicating one or more sidelink positioning capabilities of the at least one user node;
determining, by the target user node based on the sidelink positioning capability information received from the at least one user node, a sidelink positioning configuration for a sidelink positioning session to determine a position estimate of the target user node, the sidelink positioning configuration identifying at least a sidelink positioning method, one or more supporting user nodes among the at least one user node to transmit and receive sidelink positioning reference signals for obtaining one or more positioning measurements of the target user node, and a calculating node that will calculate a position estimate of the target user node based on the one or more positioning measurements received from the one or more supporting user nodes;
controlling transmitting, via a sidelink channel, by the target user node to the at least one user node that provided the sidelink positioning capability information, information indicating the sidelink positioning configuration for the sidelink positioning session; and
controlling receiving, by the target user node from the calculating node, the position estimate of the target user node, based on the one or more positioning measurements of the target user node.

2. The method of claim 1, wherein the request comprises at least one of:
a positioning request, which requests participation of the one or more other user nodes in a sidelink positioning session, to obtain a position estimate of the target user node; and/or
a request for sidelink positioning capability information of the one or more other user nodes.

3. The method of claim 1, wherein the calculating node comprises at least one of:
a calculating user node;
a calculating network node or location management function.

4. The method of claim 1, further comprising:
controlling transmitting and/or receiving, by the target user node from the at least one of the one or more other user nodes that provided the sidelink positioning capability information, via sidelink channel, a sidelink positioning reference signal;
determining, by the target user node based on the received sidelink positioning reference signal, a positioning measurement for the target user node; and
controlling transmitting, by the target user node to the calculating node, the positioning measurement of the target user node determined by the target user node.

5. The method of claim 1, further comprising:
controlling transmitting, by the target user node to the at least one of the one or more other user nodes that provided the sidelink positioning capability information, via a sidelink channel, a sidelink positioning reference signal, to enable the at least one of the one or more other user nodes that provided the sidelink positioning capability information to determine a positioning measurement of the target user node.

6. The method of claim 1, wherein the target user node is the calculating node.

7. The method of claim 1, wherein the request transmitted by the target user node comprises at least one of:
a required or preferred Quality of Service or accuracy of the position estimate of the target user node; and/or
one or more sidelink positioning methods that are usable in positioning the target user node.

8. The method of claim 1, wherein the request transmitted by the target user node comprises:
a requirement or preference to include or use a relay user node for the sidelink positioning session, where the relay user node is at least one of:
1) a user node that has a connection to the network and is able to operate as a user node-to-network relay to communicate or forward information received from a user node to the network and/or is able communicate with both user nodes and the network, and/or
2) a user node that is able to operate as a user node-to-user node relay that is able to communicate with and/or forward information to a user node that can operate as a user node-to-network relay.

9. The method of claim 1, wherein the sidelink positioning capability information received by the target user node comprises information indicating at least one of the following:
whether the at least one of the one or more other user nodes can transmit and/or receive a sidelink positioning reference signal or other reference signal used for positioning;
one or more supported configurations or transmitting and/or receiving sidelink positioning reference signals;
one or more supported sidelink positioning methods;
whether the at least one of the one or more other user nodes is synchronized and an indication of its synchronization source;
whether the at least one of the one or more other user nodes can calculate a position estimate of the target user node, and/or whether the other user node can calculate an absolute or relative position of the target user node;

the at least one of the one or more other user node's knowledge of its own position;

an energy status or level that is required for the at least one of the one or more other user nodes for positioning;

whether the at least one of the one or more other user nodes supports sidelink relaying of information between a user node and the network;

whether the at least one of the one or more other user nodes is connected to the network;

whether the at least one of the one or more other user nodes would also like to obtain a position of itself;

whether the at least one of the one or more other user nodes would like to obtain or receive a position estimate of the at least one of the one or more other user nodes;

whether the at least one of the one or more other user nodes is participating in another positioning session, and/or identifying a target user node for another positioning session for which the at least one of the one or more other user nodes is participating.

10. The method of claim 1, wherein the information indicating the sidelink positioning configuration for the sidelink positioning session further comprises:

information indicating a resource allocation of time/frequency resources for transmitting and/or receiving sidelink positioning reference signals for the positioning session.

11. The method of claim 1, wherein the information indicating the sidelink positioning configuration for the sidelink positioning session further comprises:

information indicating a resource allocation of time/frequency resources for transmitting and/or receiving sidelink positioning reference signals for the positioning session, and wherein the information indicating the resource allocation of time/frequency resources for transmitting and/or receiving sidelink positioning reference signals for the positioning session comprises one or more of the following: a subframe or a subset of a subframe(s), one or more slots, one or more subcarriers, one or more resource blocks, one or more resource elements, one or more subchannels, one or more resource pools, a bandwidth part, a frequency channel, a frequency band, a beam or antenna configuration, and/or a transmit power.

12. A target user node comprising:

at least one processor; and at least one memory including computer program code;

the at least one memory and the computer program code configured to, with the at least one processor, cause the target user node at least to:

control transmitting, via a sidelink channel, by the target user node to one or more other user nodes, a request associated with sidelink positioning;

control receiving, via a sidelink channel, by the target user node from at least one of the one or more other user nodes, sidelink positioning capability information of the at least one user node indicating one or more sidelink positioning capabilities of the at least one user node;

determine, by the target user node based on the sidelink positioning capability information received from the at least one user node, a sidelink positioning configuration for a sidelink positioning session to determine a position estimate of the target user node, the sidelink positioning configuration identifying at least a sidelink positioning method, one or more supporting user nodes among the at least one user node to transmit and receive sidelink positioning reference signals for obtaining one or more positioning measurements of the target user node, and a calculating node that will calculate a position estimate of the target user node based on the one or more positioning measurements received from the one or more supporting user nodes;

control transmitting, via a sidelink channel, by the target user node to the at least one user node that provided the sidelink positioning capability information, information indicating the sidelink positioning configuration for the sidelink positioning session; and control receiving, by the target user node from the calculating node, the position estimate of the target user node, based on the one or more positioning measurements of the target user node.

13. The target user node of claim 12, wherein the request comprises at least one of:

a positioning request, which requests participation of the one or more other user nodes in a sidelink positioning session, to obtain a position estimate of the target user node; and/or a request for sidelink positioning capability information of the one or more other user nodes.

14. The target user node of claim 12, wherein the calculating node comprises at least one of:

a calculating user node;

a calculating network node or location management function.

15. The target user node of claim 12, further comprising causing the target user node to:

controlling transmitting and/or receiving, by the target user node from the at least one of the one or more other user nodes that provided the sidelink positioning capability information, via sidelink channel, a sidelink positioning reference signal;

determining, by the target user node based on the received sidelink positioning reference signal, a positioning measurement for the target user node; and controlling transmitting, by the target user node to the calculating node, the positioning measurement of the target user node determined by the target user node.

16. The target user node of claim 12, further comprising causing the target user node to:

control transmitting, by the target user node to the at least one of the one or more other user nodes that provided the sidelink positioning capability information, via a sidelink channel, a sidelink positioning reference signal, to enable the at least one or more other user nodes that provided the sidelink positioning capability information to determine a positioning measurement of the target user node.

17. The target user node of claim 12, wherein the target user node is the calculating node.

18. The target user node of claim 12, wherein the request transmitted by the target user node comprises at least one of:

a required or preferred Quality of Service or accuracy of the position estimate of the target user node; and/or one or more sidelink positioning methods that is usable in positioning the target user node.

19. The target user node of claim 12, wherein the request transmitted by the target user node comprises:

a requirement or preference to include or use a relay user node for the sidelink positioning session, where the relay user node is at least one of:

1) a user node that has a connection to the network and is able to operate as a user node-to-network relay to communicate or forward information received from a user node to the network and/or is able communicate with both user nodes and the network, and/or 2) a user node that is able to operate as a user node-to-user node relay that is able to communicate with and/or forward information to a user node that can operate as a user node-to-network relay.

20. The target user node of claim 12, wherein the sidelink positioning capability information received by the target user node comprises information indicating at least one of the following:

whether the at least one of the one or more other user nodes can transmit and/or receive a sidelink positioning reference signal or other reference signal used for positioning;

one or more supported configurations or transmitting and/or receiving sidelink positioning reference signals;

one or more supported sidelink positioning methods;

whether the at least one of the one or more other user nodes is synchronized and an indication of its synchronization source;

whether the at least one of the one or more other user nodes can calculate a position estimate of the target user node, and/or whether the other user node can calculate an absolute or relative position of the target user node;

the at least one of the one or more other user node's knowledge of its own position;

an energy status or level that is required for the at least one of the one or more other user nodes for positioning;

whether the at least one of the one or more other user nodes supports sidelink relaying of information between a user nodes and the network;

whether the at least one of the one or more other user nodes is connected to the network;

whether the at least one of the one or more other user nodes would also like to obtain a position of itself;

whether the at least one of the one or more other user nodes would like to obtain or receive a position estimate of the at least one of the one or more other user nodes;

whether the at least one of the one or more other user nodes is participating in another positioning session, and/or identifying a target user node for another positioning session for which the at least one or more other user nodes is participating.

21. The target user node of claim 12, wherein the information indicating the sidelink positioning configuration for the sidelink positioning session further comprises:

information indicating a resource allocation of time/frequency resources for transmitting and/or receiving sidelink positioning reference signals for the positioning session.

22. The target user node of claim 12, wherein the information indicating the sidelink positioning configuration for the sidelink positioning session further comprises:

information indicating a resource allocation of time/frequency resources for transmitting and/or receiving sidelink positioning reference signals for the positioning session, and wherein the information indicating the resource allocation of time/frequency resources for transmitting and/or receiving sidelink positioning reference signals for the positioning session comprises one or more of the following: a subframe or a subset of a subframe(s), one or more slots, one or more subcarriers, one or more resource blocks, one or more resource elements, one or more subchannels, one or more resource pools, a bandwidth part, a frequency channel, a frequency band, a beam or antenna configuration, and/or a transmit power.

23. A first user node comprising:

at least one processor; and at least one memory including computer program code;

the at least one memory and the computer program code configured to, with the at least one processor, cause the first user node at least to:

control receiving, via a sidelink channel, by the first user node from a target user node to be positioned, a request associated with sidelink positioning;

in response to receiving the request, determine, by the first user node, based on sidelink positioning capabilities of the first user node and/or the request, that the first user node is able to participate in a positioning session for the target user node;

control transmitting, via a sidelink channel, by the first user node to the target user node, sidelink positioning capability information of the first user node indicating one or more of the sidelink positioning capabilities of the first user node;

control receiving, via a sidelink channel, by the first user node from the target user node, information indicating a sidelink positioning configuration for the sidelink positioning session, the sidelink positioning configuration identifying at least a sidelink positioning method, one or more supporting user nodes including the first user node to transmit and receive sidelink positioning reference signals to obtain one or more positioning measurements of the target user node, and a calculating node that will calculate a position estimate of the target user node based on the one or more positioning measurements;

control receiving a sidelink positioning reference signal from the target user node;

determine, by the first user node based on the sidelink positioning reference signal from the target user node, a positioning measurement of the target user node; and control transmitting, by the first user node to the calculating node, one or more positioning measurements including the determined positioning measurement of the target user node.

24. The first user node of claim 23, further comprising causing the first user node to:

control transmitting, by the first user node to at least the target user node via a sidelink channel, a sidelink positioning reference signal, to enable the target user node to determine a positioning measurement of the target user node.

25. The first user node of claim 23, wherein the controlling transmitting, by the first user node to the calculating node, the positioning measurement comprises:

controlling transmitting, by the first user node to the calculating node, the positioning measurement of the target user node and a position estimate of the first user node.

26. The first user node of claim 23, wherein the request comprises at least one of:

a positioning request, which requests participation in a sidelink positioning session, by the other user nodes, to obtain a position estimate of the target user node; and/or a request for sidelink positioning capability information of the one or more other user nodes.

27. The first user node of claim 23, wherein the calculating node comprises at least one of:

a calculating user node;

a calculating network node or location management function.

28. The first user node of claim 23, wherein the request comprises at least one of:

a required or preferred Quality of Service or accuracy of the position estimate of the target user node; and/or one or more sidelink positioning methods that may be used to position the target user node.

29. The first user node of claim 23, wherein the request comprises at least one of:

a required or preferred Quality of Service or accuracy of the position estimate of the target user node; and/or one or more sidelink positioning methods that may be used to position the target user node, and wherein the determining that the first user node can or is able to participate in a positioning session for the target user node comprises one or more of the following:

determining, by the first user node, that the first user node can meet or satisfy, or assist in meeting, the required or preferred Quality of Service or accuracy of the position estimate, indicated by the request; and/or determining, by the first user node, that the first user node can perform, or can provide a positioning measurement that will assist in performing, at least one of the one or more sidelink positioning methods that may be used to position the target user node.

30. The first user node of claim 23, wherein the determining, by the first user node, based on sidelink positioning capabilities of the first user node and/or the request, that the user node is able to participate in a positioning session for the target user node comprises:

determining, by the first user node, that the user node is able to participate in a positioning session for the target user node, based on a comparison, by the first user node, of one or more sidelink positioning capabilities of the first user node, one or more requirements or preferences of the positioning session indicated by the request, wherein the sidelink positioning capabilities of the first user node comprise one or more of the following:

whether the first user node can transmit and/or receive a sidelink positioning reference signal or other reference signal used for positioning;

one or more supported configurations or transmitting and/or receiving sidelink positioning reference signals;

one or more supported sidelink positioning methods that are supported by the first user node;

whether the first user node is synchronized and an indication of its synchronization source;

whether the first user node can calculate a position estimate of the target user node, and/or whether the first user node can calculate an absolute or relative position of the target user node;

the first user node's knowledge of its own position;

an energy status or level of the first user node and/or an energy status or level that is required for the first user node for positioning;

whether the first user node supports sidelink relaying of information between a user node and the network;

whether the first user node is connected to the network;

whether the first user node would also like to obtain a position of itself;

whether the first user node would like to obtain or receive a position estimate of one or more user nodes;

whether the first user node is participating in another positioning session, and/or identifying a target user node for another positioning session for which the first user node is participating.

31. The first user node of claim 23, further comprising causing the first user node to:

control transmitting, via a sidelink channel, by the first user node to at least the target user node, sidelink positioning capability information of the first user node indicating one or more of the sidelink positioning capabilities of the first user node.

32. The first user node of claim 23, further comprising causing the first user node to:

control transmitting, via a sidelink channel, by the first user node to the target user node, at least one of the following:

an indication of whether or not the first user node would like to participate or join the sidelink positioning session;

an indication of whether or not the first user node would like to participate or join the sidelink positioning session as a supporting user node that will transmit and/or receive sidelink positioning reference signals and/or will determine a positioning measurement for the target user node based on received sidelink positioning reference signals;

an indication of whether or not the first user node would like to participate or join the sidelink positioning session as a calculating user node that will calculate a position estimate for the target user node based on one or more received positioning measurements; and/or an indication of whether or not the first user node would like to be positioned as part of the sidelink positioning session.

33. The first user node of claim 23, wherein the information indicating the sidelink positioning configuration for the sidelink positioning session further comprises:

information indicating a resource allocation of time/frequency resources for transmitting and/or receiving sidelink positioning reference signals for the positioning session.

34. The first user node of claim 23, wherein the information indicating the sidelink positioning configuration for the sidelink positioning session further comprises:

information indicating a resource allocation of time/frequency resources for transmitting and/or receiving sidelink positioning reference signals for the positioning session, and wherein the information indicating the resource allocation of time/frequency resources for transmitting and/or receiving sidelink positioning reference signals for the positioning session comprises one or more of the following:

a subframe or a subset of a subframe(s), one or more slots, one or more subcarriers, one or more resource blocks, one or more resource elements, one or more subchannels, one or more resource pools, a bandwidth part, a frequency channel, a frequency band, a beam or antenna configuration, and/or a transmit power.

\* \* \* \* \*